United States Patent
Maat

(10) Patent No.: US 11,572,083 B2
(45) Date of Patent: Feb. 7, 2023

(54) NEURAL NETWORK BASED PREDICTION OF HIDDEN CONTEXT OF TRAFFIC ENTITIES FOR AUTONOMOUS VEHICLES

(71) Applicant: Perceptive Automata, Inc., Boston, MA (US)

(72) Inventor: Jacob Reinier Maat, Boston, MA (US)

(73) Assignee: Perceptive Automata, Inc., Boston, MA (US)

( * ) Notice: Subject to any disclaimer, the term of this patent is extended or adjusted under 35 U.S.C. 154(b) by 290 days.

(21) Appl. No.: 16/932,680

(22) Filed: Jul. 17, 2020

(65) Prior Publication Data

US 2021/0024090 A1    Jan. 28, 2021

Related U.S. Application Data

(60) Provisional application No. 62/880,076, filed on Jul. 29, 2019, provisional application No. 62/877,087, filed on Jul. 22, 2019.

(51) Int. Cl.
    *G06V 10/50*      (2022.01)
    *G06V 20/58*      (2022.01)
    (Continued)

(52) U.S. Cl.
CPC ........ *B60W 60/0025* (2020.02); *B60W 40/02* (2013.01); *B60W 40/09* (2013.01); *B60W 60/0017* (2020.02); *B60W 60/00276* (2020.02); *G05D 1/0246* (2013.01); *G06N 3/0481* (2013.01); *G06N 3/08* (2013.01); *G06V 10/507* (2022.01); *G06V 20/584* (2022.01); *B60W 2420/42* (2013.01); *B60W 2540/229* (2020.02); *B60W 2540/30* (2013.01); *G05D 2201/0213* (2013.01)

(58) Field of Classification Search
None
See application file for complete search history.

(56) References Cited

U.S. PATENT DOCUMENTS 7,269,516 B2    9/2007    Brunner et al.
8,175,333 B2    5/2012    Eaton et al.
(Continued)

OTHER PUBLICATIONS

Girdhar, R. and Ramanan, D., "Attentional Pooling for Action Recognition," 31st Conference on Neural Information Processing Systems (NIPS 2017), 12 pages.
(Continued)

*Primary Examiner* — Idowu O Osifade
(74) *Attorney, Agent, or Firm* — Fenwick & West LLP

(57) ABSTRACT

An autonomous vehicle uses machine learning based models such as neural networks to predict hidden context attributes associated with traffic entities. The hidden context represents behavior of the traffic entities in the traffic. The machine learning based model is configured to receive a video frame as input and output likelihoods of receiving user responses having particular ordinal values. The system uses a loss function based on cumulative histogram of user responses corresponding to various ordinal values. The system identifies user responses that are unlikely to be valid user responses to generate training data for training the machine learning mode. The system identifies invalid user responses based on response time of the user responses.

20 Claims, 11 Drawing Sheets

(51) Int. Cl.
*B60W 60/00* (2020.01)
*B60W 40/02* (2006.01)
*G06N 3/08* (2023.01)
*B60W 40/09* (2012.01)
*G05D 1/02* (2020.01)
*G06N 3/04* (2023.01)

(56) References Cited

U.S. PATENT DOCUMENTS

| | | | |
|---|---|---|---|
| 8,854,457 | B2 | 10/2014 | De Vleeschouwer et al. |
| 9,881,221 | B2 | 1/2018 | Bala et al. |
| 10,186,123 | B2 | 1/2019 | Kanaujia et al. |
| 10,402,687 | B2 | 9/2019 | Anthony et al. |
| 2015/0213555 | A1 | 7/2015 | Barfield, Jr. et al. |
| 2017/0153639 | A1 | 6/2017 | Stein |
| 2017/0270374 | A1 | 9/2017 | Myers et al. |
| 2018/0146198 | A1 | 5/2018 | Atluru et al. |
| 2019/0150357 | A1* | 5/2019 | Wu .................... G06T 7/73 |

OTHER PUBLICATIONS

He, K., et al. "Mask R-CNN," Computer Vision and Pattern Recognition 1703.06870v3, Jan. 24, 2018, 12 pages.

International Search Report and Written Opinion, PCT Application No. PCT/US2018/063459, dated Feb. 7, 2019, 13 pages.

Karmarkar, T., "Regional Proposal network (RPN)—Backbone of Faster R-CNN," Aug. 18, 2018, 6 pages, [Online][Retrieved Jan. 5, 2019], Retrieved from the internet <URL:https://medium.com/@tanaykarmarkar/region-proposal-network-rpn-bac>.

Kotseruba, I., et al., Joint Attention in Autonomous Driving (JADD),' Robotics 1609.04741v5, Apr. 24, 2017, 10 pages.

Newell, A., et al., "Stacked Hourglass Networks for Human Pose Estimation," Computer Vision and Pattern Recognition 1603.06937v2, Jul. 26, 2016, 17 pages.

Ren, S. et al. "Faster R-CNN: Towards Real-Time Object Detection with Region Proposal Networks," Advances in Neural Information Processing Systems 28 (NIPS 2015), 9 pages.

Ren, S. et al. "Faster R-CNN: Towards Real-Time Object Detection with Region Proposal Networks," Computer Vision and Pattern Recognition 1506.01497v3, Jan. 6, 2016, 14 pages.

Santoro, A. et al., "A neural approach to relational reasoning," Jun. 6, 2017, 6 pages, [Online][Retrieved Jan. 5, 2019], Retrieved from the internet <URL:https://deepmind.com/blog/neural-approach-relational-reasoning/>.

Santoro, A. et al., "A simple neural network module for relational reasoning," Computation and Language 1706.01427, Jun. 5, 2017, 16 pages.

Schneemann, F., et al., "Context-based Detection of Pedestrian Crossing Intention for Autonomous Driving in Urban Environments," 2016 IEEE/RSJ International Conference on Intelligent Robots and Systems (IROS), Oct. 2016, 6 pages.

Watters, N., et al.,"Visual Interaction Networks," Computer Vision and Pattern Recognition 1706.01433v1, Jun. 5, 2017, 14 pages.

Zhao, H., et al., "Pyramid Scheme Parsing Network," Computer Vision and Pattern Recognition 1612.01105v2, Apr. 27, 2017, 11 pages.

* cited by examiner

NEURAL NETWORK BASED PREDICTION OF HIDDEN CONTEXT OF TRAFFIC ENTITIES FOR AUTONOMOUS VEHICLES

CROSS REFERENCE TO RELATED APPLICATIONS

This application claims the benefits of priority under 35 USC 119(e) to U.S. Provisional Application No. 62/877,087 filed on Jul. 22, 2019 and U.S. Provisional Application No. 62/880,076, filed on Jul. 29, 2019, each of which is incorporated herein by reference in its entirety for all purposes.

This invention was made with government support under Award No. 1738479 awarded by National Science Foundation's Division of Industrial Innovation and Partnerships (IPP). The government has certain rights in the invention.

TECHNICAL FIELD

The present disclosure relates generally to navigating an autonomous vehicle through traffic and more specifically to neural network based prediction of hidden context of traffic entities for autonomous vehicles.

BACKGROUND

An autonomous vehicle uses different types of sensors to receive input describing the surroundings (or environment) of the autonomous vehicle while driving through traffic. For example, an autonomous vehicle may perceive the surroundings using camera images and lidar scans. The autonomous vehicle determines whether an object in the surroundings is stationary, for example, buildings or trees or the object is non-stationary, for example, a pedestrian, a vehicle, and so on. The autonomous vehicle predicts the motion of non-stationary objects to make sure that the autonomous vehicle is able to navigate through non-stationary obstacles in the traffic.

Motion vectors of objects is often used to predict the future movement or position of the object. However, current movement of a pedestrian may not provide an accurate prediction of future movement of the pedestrian. For example, a pedestrian standing on a cross walk may suddenly start moving to cross the street. Or a pedestrian may quickly enter the street to pick up some object that the pedestrian may have dropped but never cross the street. Therefore, conventional techniques are unable to accurately predict motion of non-stationary objects, for example, pedestrians, bicyclists, and so on.

SUMMARY

Embodiments of the invention include methods, systems, and non-transitory computer readable storage media storing instructions that when executed by a computer processor cause the computer processor to execute steps of a method for generating machine learning based models such as neural networks to predict hidden context attributes associated with traffic entities. A traffic entity may represent a pedestrian, a bicyclist, or another vehicle in a traffic encountered by a vehicle. The hidden context of a traffic entity represents an attribute of a behavior of the traffic entities in the traffic. For example, the hidden context may represent a state of mind of a user represented by the traffic entity. The hidden context may represent a task that a user represented by the traffic entity is planning on accomplishing, for example, crossing the street. The hidden context may represent a degree of awareness of the vehicle executing the method by a user represented by the traffic entity. The hidden context represents a goal of a user represented by the traffic entity, wherein the user expects to achieve the goal within a threshold time interval, for example, crossing the street within the next few seconds. The system trains a neural network for help in navigating through traffic. In an embodiment, the neural network is configured to receive an image of traffic as input and generate output representing hidden context for a traffic entity displayed in the image.

The system receives sensor data from sensors mounted on vehicle, for example, videos or images captured by cameras. The system stores video frames extracted from videos captured by cameras. Each video frame displays a traffic entity. The system generates training data set including video frames. For each video frame, the system stores a vector representing a likelihood of receiving a user response for each of the plurality of ordinal values. For example, the system may send the video frame or a set of video frames to users and receive user responses describing hidden context attributes associated with the video frames. The system users the user responses to determine a likelihood of receiving a user response for each of the plurality of ordinal values.

The system trains a machine learning based model, for example, a neural network using the training data set. The machine learning based model is configured to receive a video frame as input and output a vector. Each element of the vector represents a likelihood of receiving a user response having a particular ordinal value. The training of the machine learning based model includes determining a loss value for each input video frame. The system determines the loss value by providing a video frame from the training data set as input to the machine learning based model, predicting an output result vector using the machine learning based model. The system determines a cumulative histogram based on the output result vector. The system determines a loss value as a measure of difference between the cumulative histogram based on the output result vector and a cumulative histogram for the video frame determined based on the user responses. The system adjusts weights of the neural network to minimize the loss function. The machine learning based model may be used for navigating vehicles, for example, autonomous vehicles.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Embodiments of the invention predict hidden context associated with traffic entities that determines behavior of these traffic entities in the traffic. A traffic entity represents an object in traffic, for example, a pedestrian, a bicycle, a vehicle, a delivery robot, and so on. Hidden context includes factors that affect the behavior of such traffic entities, for example, a state of mind of a pedestrian, a degree of awareness of the existence of the autonomous vehicle in the vicinity, for example, whether a bicyclist is aware of the existence of the autonomous vehicle in the proximity of the bicyclist, and so on. The system uses the hidden context to predict behavior of people near a vehicle in a way that more closely resembles how human drivers would judge the behavior.

In one embodiment, a group of users or human observers view sample images of traffic entities near streets and/or vehicles and indicate or are measured for their understanding of how they believe the people will behave. These indicators or measurements are then used as a component for training a machine learning based model that predicts how people will behave in a real-world context. In other words, after being trained based on the reactions of human observers to sample images in a training environment, the machine learning based model predicts behavior of traffic entities in a real-world environment, for example, actual pedestrian behavior in a real-world environment.

Embodiments of the invention determine whether certain user responses are invalid use responses and filter them out so that bad user responses are not used as training data for training machine learning based models.

Systems for predicting human interactions with vehicles are disclosed in U.S. patent application Ser. No. 15/830,549, filed on Dec. 4, 2017 which is incorporated herein by reference in its entirety.

System Environment

Figure 1:
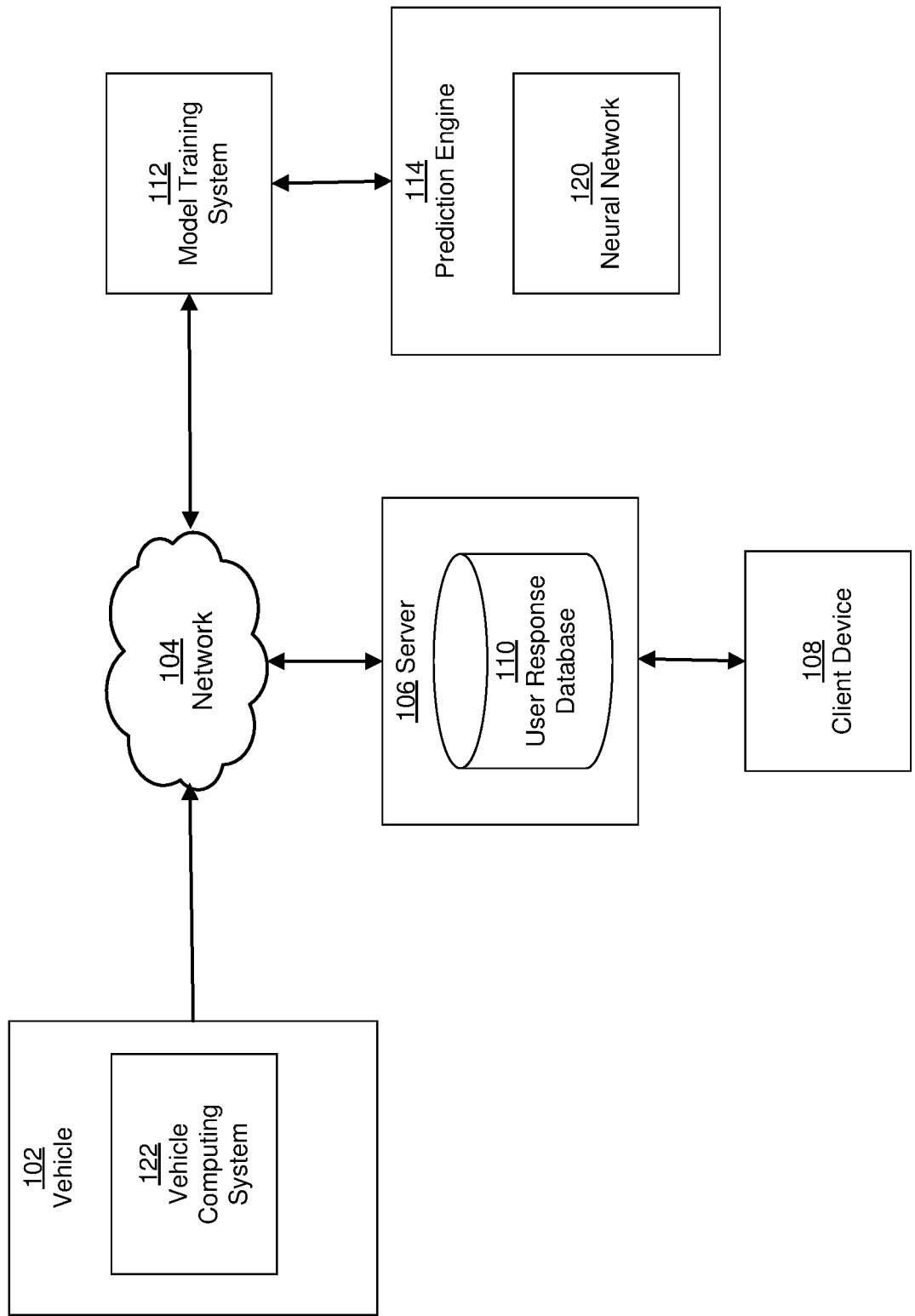
FIG. 1 is a system diagram of a networked system for predicting human behavior according to some embodiments of the invention.

FIG. 1 is a system diagram of a networked system for predicting human behavior according to some embodiments of the invention. FIG. 1 shows a vehicle 102, a network 104, a server 106, a user response database 110, a client device 108, a model training system 112 and a prediction engine 114.

The vehicle 102 can be any type of manual or motorized vehicle such as a car, bus, train, scooter, or bicycle. As described in more detail below, the vehicle 102 can include sensors for monitoring the environment surrounding the vehicle. In one implementation, the sensors can include a camera affixed to any portion of the vehicle for capturing a video of people near the vehicle.

The network 104 can be any wired and/or wireless network capable of receiving sensor data collected by the vehicle 102 and distributing it to the server 106, the model training system 112, and, through the model training system 112, the prediction engine 114. In an embodiment, the prediction engine 114 comprises a neural network 120.

The server 106 can be any type of computer system capable of (1) hosting information (such as image, video and text information) and delivering it to a user terminal (such as client device 108), (2) recording responses of multiple users (or human observers) to the information, and (3) delivering such information and accompanying responses (such as responses input via client device 108) back to the network 104.

The user response database 110 can be any type of database or data storage system capable of storing the image, video, and text information and associated user responses and subsequently recalling them in response to a query.

The model training system 112 can be implemented in any type of computing system. In one embodiment, the system 112 receives the image, video, and/or text information and accompanying, or linked, user responses from the database 110 over the network 104. In some embodiments, the text segments are discrete values or free text responses. The model training system 112 can use images, video segments and text segments as training examples to train an algorithm, and can create labels from the accompanying user responses based on the trained algorithm. These labels indicate how the algorithm predicts the behavior of the people in the associated image, video, and/or text segments. After the labels are created, the model training system 112 can transmit them to the prediction engine 144.

The prediction engine 114 can be implemented in any computing system. In an illustrative example, the prediction engine 114 executes a process that executes a model that has been trained by the model training system 112. This process estimates a label for a new (e.g., an actual "real-world") image, video, and/or text segment based on the labels and associated image, video, and/or text segments that it received from the model training system 112. In some embodiments, this label comprises aggregate or summary information about the responses of a large number of users (or human observers) presented with similar image, video, or text segments while the algorithm was being trained.

In an embodiment, the prediction engine 114 uses machine learning based models for predicting hidden context values associated with traffic entities. In an embodiment, the machine learning based model is a neural network configured to receive an encoding of an image or a video of a traffic entity as input and predict hidden context associated with the traffic entity. Examples of traffic entities include pedestrians, bicyclists, or other vehicles. Examples of hidden context include, awareness of a bicyclist that a particular vehicle is driving close to the bicyclist, and intent of a pedestrian, for example, intent to cross a street, intent to continue walking along a sidewalk, and so on. A non-stationary object may also be referred to as a movable object. An object in the traffic may also be referred to as an entity or a traffic entity.

Figure 2:
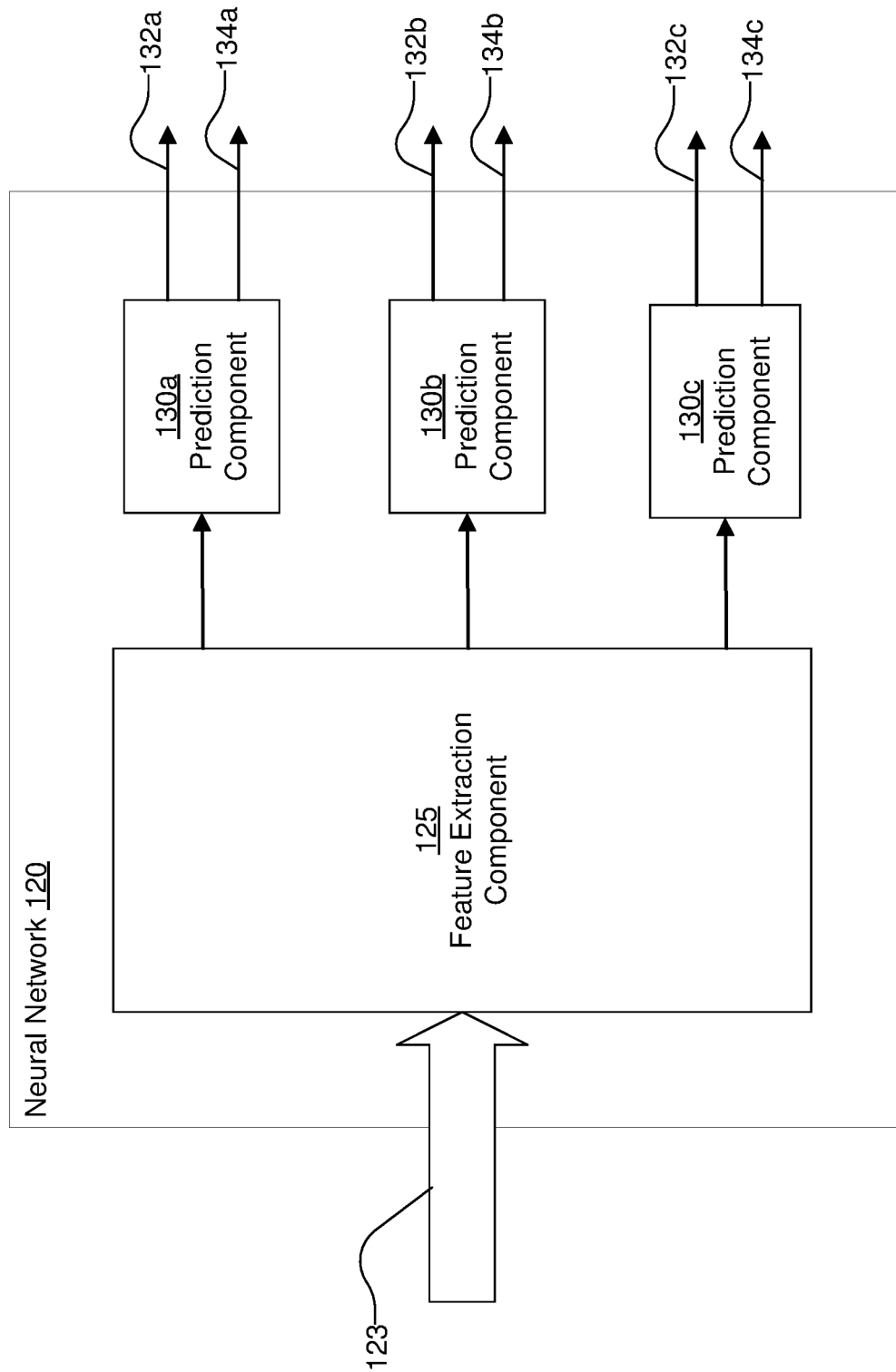
FIG. 2 is the system architecture of a vehicle computing system that routes an autonomous vehicle based on prediction of hidden context associated with traffic objects according to an embodiment of the invention.

FIG. 2 is the system architecture of neural network used for prediction of hidden context associated with traffic entities, according to some embodiments of the invention. The neural network 120 is a deep neural network comprising a plurality of layers of nodes. The layers of the neural network comprise an input layer that receives the input values, an output layer that outputs the result of the neural network and one or more hidden layers. Each hidden layer receives input from a previous layer and generates values that are provided as input to a subsequent layer. In an embodiment, the neural network 120 is a convolutional neural network. In an embodiment, the neural network 120 is an LSTM (long short-term model).

The neural network 120 receives an encoding of an image or video as input 123. The neural network is configured to predict estimates of measures of uncertainty for hidden context attributes. The input 123 comprises stored images or videos provided as training data during a training phase of the neural network 120. An image may represent a video frame. Once the neural network 120 is trained, the neural network 120 may be deployed in a vehicle, for example, an autonomous vehicle.

In an embodiment, the neural network 120 is a multi-task neural network configured to predict a plurality of output values representing different hidden context attributes. A multi-task neural network provides efficiency in training the model since the same model is able to predict multiple values. Accordingly, the process of training of the neural network as well as execution of the trained neural network is efficient in terms of performance. Furthermore, the sharing of the feature extraction component 125 across different prediction components 130 results in better training of the neural network.

The sensors of an autonomous vehicle capture sensor data 160 representing a scene describing the traffic surrounding the autonomous vehicle. The traffic includes one or more traffic entities, for example, a pedestrian. The autonomous vehicle provides sensor data as input to the neural network 120, for example, video frames of videos captured by cameras of the autonomous vehicle. In an embodiment, the input to the neural network 120 is a portion of a video frame that represents a bounding box around a traffic entity, for example, a pedestrian. In an embodiment, the input to the neural network is a sequence of bounding boxes surrounding the traffic entity obtained from a sequence of video frames showing the traffic entity, for example, in a video of a pedestrian captured as the pedestrian walks on a street. The autonomous vehicle uses the results of the neural network model to generate control signals for providing to the vehicle controls for example, accelerator, brakes, steering, and so on for navigating the autonomous vehicle through traffic.

The neural network 120 comprises components including a feature extraction component 125 and a plurality of prediction components 130a, 130b, 130c, and so on. Each prediction component 130 predicts values for a particular hidden context attribute. For example, a prediction component 130a may predict values describing intent of a pedestrian to perform certain action (e.g., crossing the street), a prediction component 130b may predict values describing awareness of a bicyclist of a vehicle following the bicyclist, and so on.

Each prediction component outputs two values associated with a hidden context attribute, a value 132 representing the predicted value of the hidden context attribute and a value 134 representing a measure of uncertainty associated with the predicted value 132. In an embodiment, the predicted value 132 represents parameters describing statistical distribution of a hidden context attribute. In an embodiment, the predicted value 132 is a vector such that each value of the vector represents a likelihood that at an observer would assign a particular value to the hidden context attribute. For example, the hidden context attribute may have a plurality of possible values v1, v2, v3, and so on and the predicted value 132 is a vector comprising probability values p1, p2, p3, and so on such that p1 represents a likelihood that at an observer would assign value v1 to the hidden context attribute, p2 represents a likelihood that at an observer would assign value v2 to the hidden context attribute, p3 represents a likelihood that at an observer would assign value v3 to the hidden context attribute, and so on.

The predicted value 134 is a measure of uncertainty corresponding to the output 132. Accordingly, if the output 132 is a vector of multiple values, the output 134 is also a vector of multiple values, each value of the vector corresponding to output 134 representing a measure of uncertainty for the corresponding value in the vector corresponding to output 132.

As an example, the system requests user responses from users observing images of traffic entities, wherein each user response is one of a plurality of values. Each value from the plurality of values corresponds to a rating that the user provides to a hidden context of the traffic entity. For example, the user response may be a value between 1 to 5 (e.g., each user response is one value selected from the values 1, 2, 3, 4, and 5). The user response indicates, what the user believes is the value of the hidden context attribute, for example, on a scale from 1-5, a number indicating how likely the user believes, a pedestrian is likely to cross the street or how likely a bicyclist is aware of a vehicle. The output 132 represents a vector of values, each value corresponding to a possible user response and representing the likelihood that a user presented with the input image would provide that user response. The output 134 represents a vector of values, each value representing a measure of uncertainty for the corresponding value from output 132.

Figure 3:
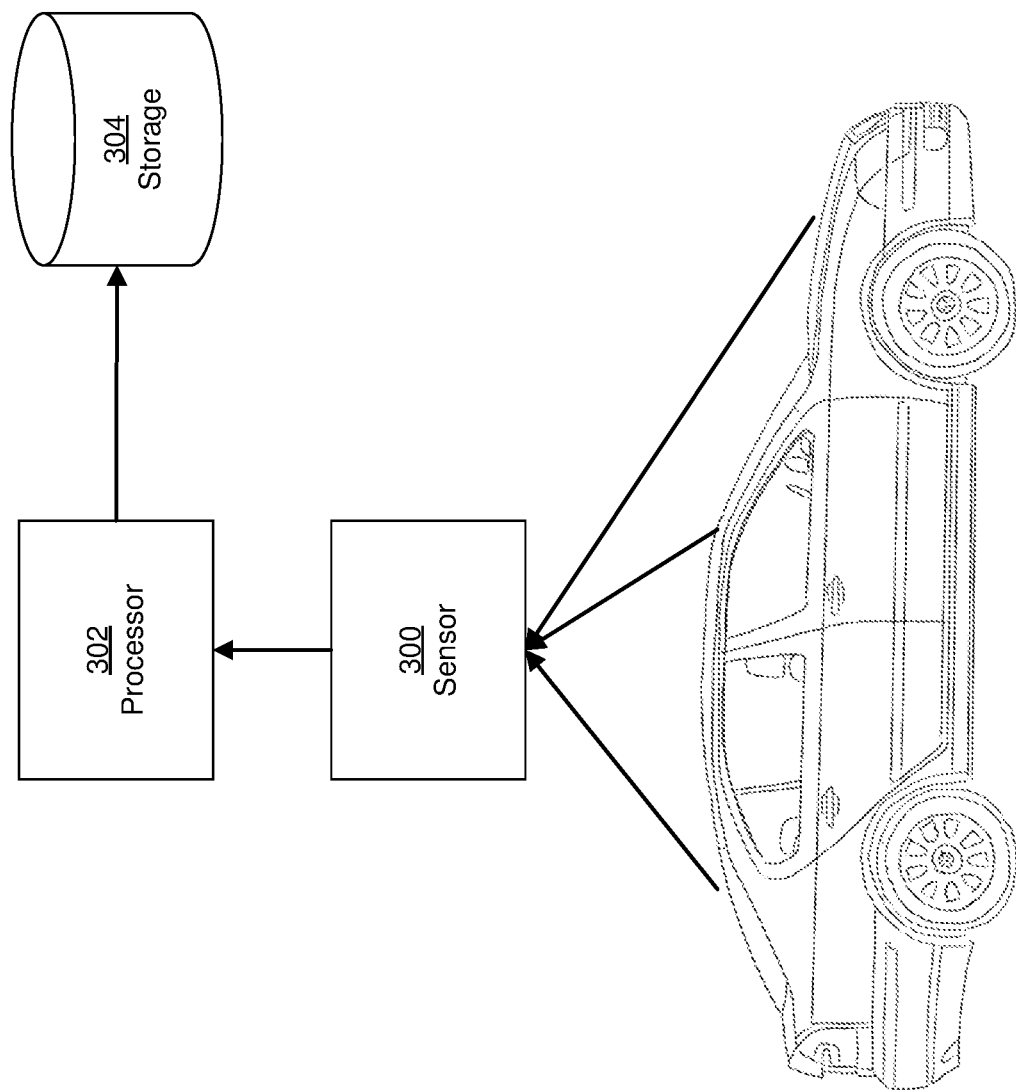
FIG. 3 is a system diagram showing a sensor system associated with a vehicle, according to some embodiments of the invention.

FIG. 3 is a system diagram showing a sensor system associated with a vehicle, according to some embodiments of the invention. FIG. 3 shows a vehicle 306 with arrows pointing to the locations of its sensors 300, a local processor and storage 302, and remote storage 304.

Data is collected from cameras or other sensors 300 including solid state Lidar, rotating Lidar, medium range radar, or others mounted on the car in either a fixed or temporary capacity and oriented such that they capture images of the road ahead, behind, and/or to the side of the car. In some embodiments, the sensor data is recorded on a physical storage medium (not shown) such as a compact flash drive, hard drive, solid state drive or dedicated data logger. In some embodiments, the sensors 300 and storage media are managed by the processor 302.

The sensor data can be transferred from the in-car data storage medium and processor 302 to another storage medium 304 which could include cloud-based, desktop, or hosted server storage products. In some embodiments, the sensor data can be stored as video, video segments, or video frames.

Figure 4:
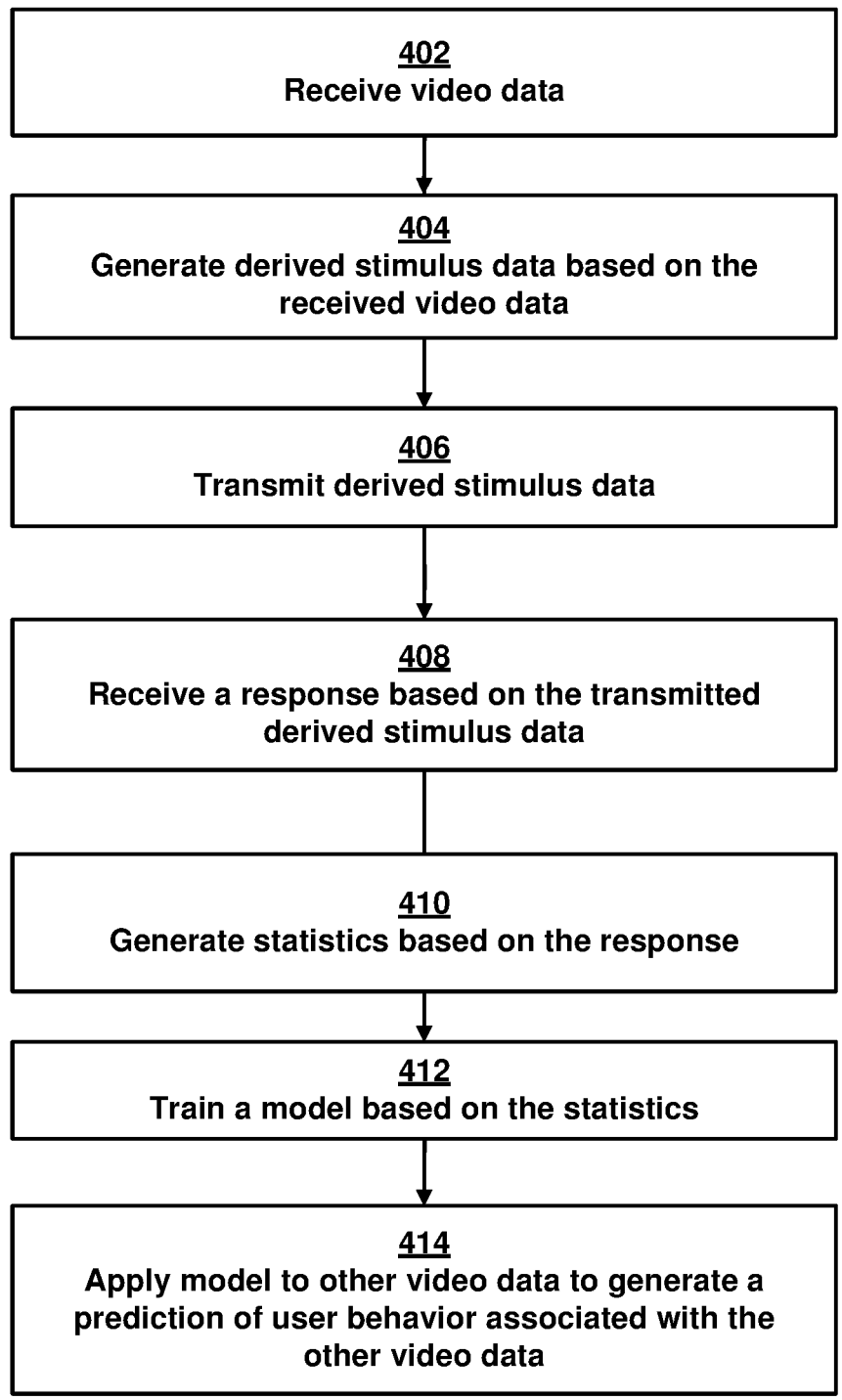
FIG. 4 is a flowchart showing a process of training a machine learning based model to predict hidden context information describing traffic entities, according to some embodiments of the invention.

FIG. 4 is a flowchart showing a process of training a machine learning based model to predict hidden context information describing traffic entities, according to some embodiments of the invention. In one implementation, video or other data is captured by a camera or sensor mounted on the vehicle 102. The camera or other sensor can be mounted in a fixed or temporary manner to the vehicle 102. Of course, the camera does not need to be mounted to an automobile, and could be mounted to another type of vehicle, such as a bicycle. As the vehicle travels along various streets, the camera or sensor captures still and/or moving images (or other sensor data) of pedestrians, bicycles, automobiles, etc. moving or being stationary on or near the streets. In step 402, this video or other data captured by the camera or other sensor is transmitted from the vehicle 102, over the network 104, and to the server 106 where it is stored.

Then, in step 404, video frames or segments are extracted from the stored video or other data and are used to create stimulus data including derived stimulus (or stimuli). In one implementation, the derived stimulus corresponds to a scene in which one or more humans are conducting activities (e.g., standing, walking, driving, riding a bicycle, etc.) beside or on a street and/or near a vehicle. As explained in more detail below for example in step 214 and in the text accompanying FIG. 9, as part of the training process for the prediction algorithm, human observers view the derived stimulus and predict how they believe the humans shown in the derived stimulus will act. In yet a further implementation, after the video frames or segments are extracted from the stored data, the derived stimulus is generated by manipulating the pixels or equivalent array data acquired from the camera or other sensor in step 204, producing a new data file that conveys a portion of the information from the original video with certain aspects highlighted or obscured.

In step 406, the derived stimulus is transmitted from the server 106 and displayed to a large number of users (or human observers) on the client device 108 (or multiple client devices 108). The client devices(s) 108 prompt the human observers to predict how the people shown in the derived stimulus will act, and upon viewing the displayed stimulus, the observers input their responses corresponding to their predictions. For example, the human observers may predict that a bicyclist will continue riding, whether a first person in the stimulus will cross the street, whether another person will remain standing on a street corner, and yet another person will change lanes on his or her bicycle. In an illustrative embodiment, the human observers may make a continuous or ordinal judgment about the state of mind or the predicted behavior of the people shown in the derived stimulus and record that judgment. For example, the human observers may select an appropriate icon displayed on the client devices(s) 108 by clicking a mouse or by pressing a key to indicate their judgment or prediction. The judgment or prediction may correspond to the human observers' assessment of the state of mind of the person in the derived stimulus or other awareness or intention that would be relevant to a hypothetical driver who sees the person in the derived stimulus while driving. In step 408, the derived stimulus and associated human observer responses are transmitted from the client device(s) 108 to the server 106 and recorded in the user response database 110.

In step 410, summary statistics are generated based on the user responses. For example, the statistics may characterize the aggregate responses of multiple human observers to a particular derived stimulus. For instance, if the derived stimulus shows a pedestrian walking on a sidewalk towards an intersection, the response can be categorized in terms of how many human observers believe that the pedestrian will stop upon reaching the intersection, continue walking straight across the intersection, turn a corner and continue walking along the sidewalk without crossing the intersection, etc. These summary statistics can characterize the human observer responses in terms of certain parameters associated with the statistics, such as a content of a response, a time associated with entering a response, and a position of an eye of a human observer associated with the response. The parameters can also be associated with a (1) central tendency, variance, skew, kurtosis, scale, or histogram. For example, the amount of time users took to input their responses can be characterized in terms of central tendency, variance, skew, kurtosis, scale, histogram. Also, the statistics can include a parameter that additionally or alternatively characterizes the movement of the human observers' eyes relative to a display when making the judgments in terms of central tendency, variance, skew, kurtosis, scale, histogram or two-dimensional distribution. In one embodiment, the statistics are stored in the user response database 110 with an index that identifies the raw video or sensor data from which the derived stimulus was generated. In a further embodiment, the statistics stored in the database 110 cover a large set of images of people on or near roads and are categorized in a number of different categories, such as pedestrian, driver, motorcyclist, bicyclist, scooter driver, self-balancing scooter rider, unicyclist, motorized wheelchair user, skateboarder, or others. Moreover, the statistics are respectively stored along with, or linked to, the images of the derived stimuli corresponding to the statistics.

In step 412, the stored statistics and corresponding images (e.g., the video frames or segments that were extracted from the video or other data (captured from the camera or sensor of the vehicle 202)) are sent over the network 104 to the model training system 112 and used to train a prediction algorithm. For example, the collection of images and statistics can be used to train a supervised learning algorithm, which can comprise a random forest regressor, a support vector regressor, a simple neural network, a deep convolutional neural network, a recurrent neural network, a long-short-term memory (LSTM) neural network with linear or nonlinear kernels that are two dimensional or three dimensional, or any other supervised learning algorithm which is able to take a collection of data labeled with continuous values and adapt its architecture in terms of weights, structure or other characteristics to minimize the deviation between its predicted label on a novel stimulus and the actual label collected on that stimulus using the same method as was used on the set of stimuli used to train that network. The model is given data which comprises some subset of the pixel data from the video frames that the summary statistics were generated from. In one implementation, this subset includes the pixel data contained in a bounding box drawn to contain the boundaries of the person, cyclist, motorist and vehicle, or other road user, including their mode of conveyance. In some other implementations, it also includes the entire pixel data from the rest of the image. In one of those implementations, that pixel data is selected according to criteria such as the salience of those features in terms of contrast, lighting, presence of edges, or color. In an additional implementation, the features can include descriptive meta-data about the images such as the dimensions and location of the bounding box, the shape of the bounding box or the change in size or position of the bounding box from one frame to the next.

In step 414, the prediction engine 114 uses the trained model from the model training system 112 to predict the actual, "real-world" or "live data" behavior of people on or near a road. In one embodiment, the prediction engine 114 receives "live data" that matches the format of the data used to train the trained model. For example, if the trained model was trained based on video data received from a camera on the vehicle 102, the "live data" that is input to the algorithm likewise is video data from the same or similar type camera.

On the other hand, if the model was trained based on another type of sensor data received from another type of sensor on the vehicle 102, the "live data" that is input to the prediction engine 114 likewise is the other type of data from the same or similar sensor.

The trained model or algorithm makes a prediction of what a pedestrian or other person shown in the "live data" would do based on the summary statistics and/or training labels of one or more derived stimulus. The accuracy of the model is determined by having it make predictions of novel derived stimuli that were not part of the training images previously mentioned but which do have human ratings attached to them, such that the summary statistics on the novel images can be generated using the same method as was used to generate the summary statistics for the training data, but where the correlation between summary statistics and image data was not part of the model training process. The predictions produced by the trained model comprise a set of predictions of the state of mind of road users that can then be used to improve the performance of autonomous vehicles, robots, virtual agents, trucks, bicycles, or other systems that operate on roadways by allowing them to make judgments about the future behavior of road users based on their state of mind.

The server 106 generates derived stimuli from raw camera or sensor data of the vehicle for presenting to human observers. As described above, sensor data can include video segments or specific frames. These frames can either be contiguous or non-contiguous, and can be in the original order, in a permuted order, in reverse order, or in random order. Some of the frames can be repeated once or more than once.

Some of the frames may be manipulated. The frames can be manipulated by adjusting pixel values. These manipulations can include blurring, the addition or one or more occluding bars, bands, or shapes, sharpening, the removal of color information, the manipulation of color information, the drawing of non-occluding or highlighting shapes on the image, other manipulations, or a combination of the manipulations listed here, or a combination of the manipulations listed here with other manipulations, or other manipulations of the pixels not listed combined with each other. The manipulations serve the purpose of highlighting, occluding or degrading portions of the image, so that when the images are shown to the human observers, they are directed to people or specific portions of the image when predicting what the people in the images will do. For example, using the highlighting described above, a certain pedestrian in a scene can be isolated such that a human observer's feedback can be more reliably associated with the pedestrian. Frames may be recombined to form a derived stimulus. In some embodiments, if there is only one frame, that frame comprises the derived stimulus. If there is more than one frame those frames may then be recombined.

Predictions and other information is collected from human observers based on derived stimuli. Human observers are given detailed instructions about how to answer questions about derived stimuli. Those observers are presented with derived stimuli and asked to answer questions about them. The observers respond to the stimuli and those responses are recorded. The recorded responses are aggregated and logged in a database, for example, the user response database 110.

Human observers are recruited to participate on one or several crowdsourcing websites, such as Amazon's Mechanical Turk or at a physical location provided with a display. The observers are given detailed written and pictorial instructions explaining the task that they are about to complete. These instructions give examples of situations that might be depicted in the derived stimuli, and the kinds of responses that would be appropriate for those situations.

The human observers may be shown a display which includes the derived stimulus. The display also includes a mechanism for making a judgment about the stimulus. The mechanism for making the judgment can be a continuous indicator such as a ribbon on which the observer could drag a control to a certain point. The mechanism can also be an ordinal measure such as a Likert scale where the observer can make a judgment about a degree of certainty of the judgment. The mechanism can also be a control that the human observer drags with their mouse to draw a trajectory onscreen indicating a judgment. The mechanism can also be a text entry field where the observer types a description of their judgment.

The judgment that the human observer makes is a hidden context attribute that may represent an evaluation of the state of mind of a road user depicted in the derived stimulus. The evaluation can be of the intention, awareness, personality, state of consciousness, level of tiredness, aggressiveness, enthusiasm, thoughtfulness or another characteristic of the internal mental state of the pictured road user. If the ratings collected are on an ordinal scale they can describe the characteristic using language of probability, such as "the other driver may be attentive" or "the other driver" is definitely attentive" or "the other driver is definitely not attentive".

The ratings of large numbers of human observers are collected. Summary statistics are generated based on the responses of all of the observers who looked at an image. Individual variability in responses to a given stimulus can be characterized in the information given by the observers to the learning algorithm. The summary statistics might include unweighted information from all observers, or might exclude observers based on extrinsic or intrinsic criteria such as the time it took an observer to respond, the geographical location of an observer, the observer's self-reported driving experience, or the observer's reliability in making ratings of a set of other images.

The explicit response of the observer is recorded as well as implicit data. The implicit data can include how long the subject took to respond, if they hesitated in their motions, if they deleted keystrokes, if they moved the mouse anywhere other than the location corresponding to the response they eventually chose, where their eyes moved, or other implicit measures.

The responses are aggregated and recorded in a data structure, such as the user response database 110. This data structure is then sent as a text field to a networked computer system running database software and logged in a database.

Figure 6:
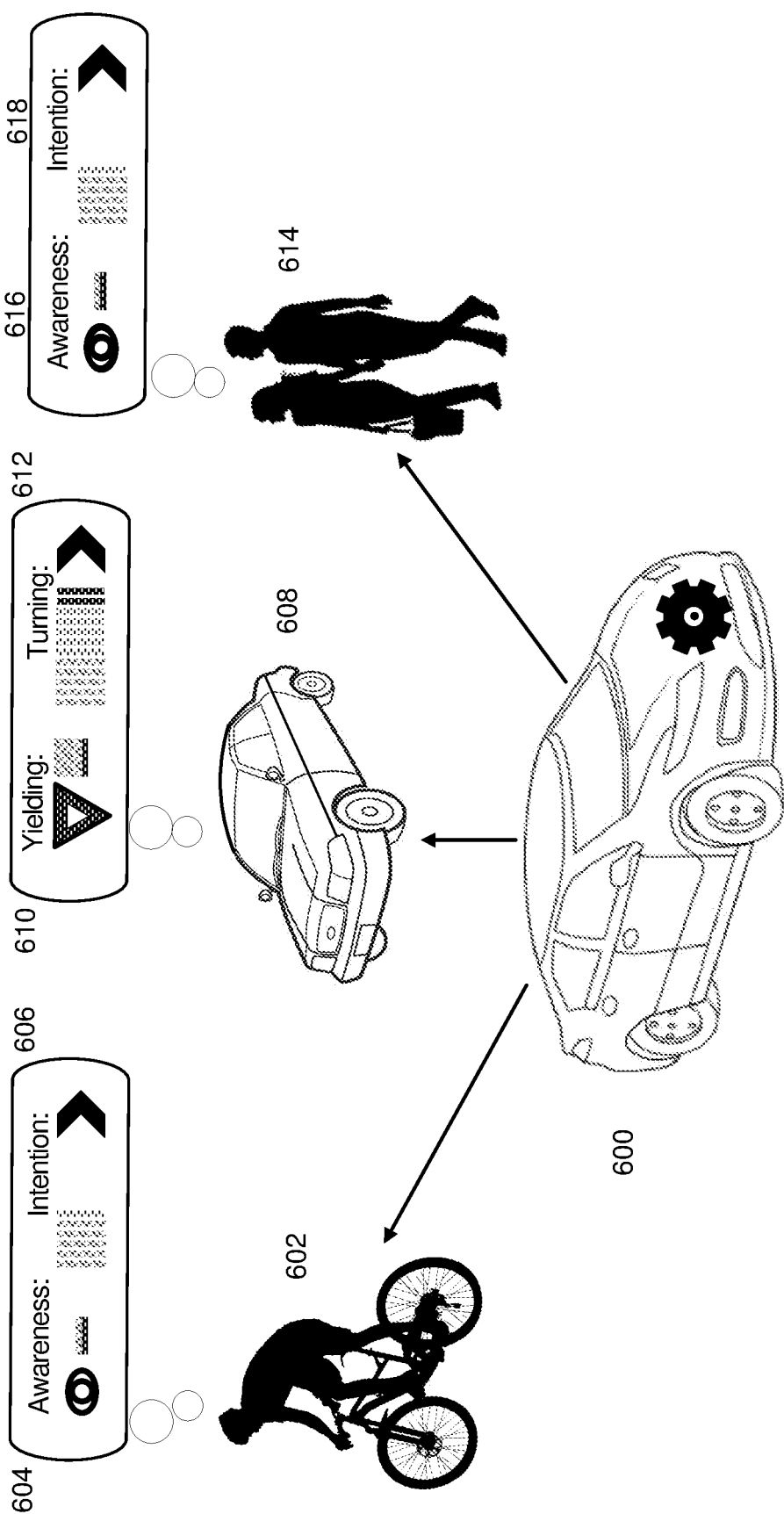
FIG. 6 is a diagram showing an example of an application of a context user prediction process in an automobile context, according to some embodiments of the invention.

For each stimulus rated by each human observer, a response is recorded that could be a continuous, discrete, or ordinal value. This value may refer to the probability of the pictured human road user has a given state of mind—e.g. that a pedestrian is likely to cross the street or that an oncoming vehicle is unlikely to be willing to yield to the vehicle containing the sensor if the vehicle containing the sensor needs to turn. In some embodiments, a higher ordinal value (e.g., the ordinal 4 as shown in FIG. 6) indicates that a human observer believes that there is a higher probability that the pictured human road user has a given state of mind or will perform a particular action. On the other hand, a lower ordinal value (e.g., the ordinal 1) indicates that the human observer believes that there is a lower probability that the pictured human road user has the state of mind or will perform the particular action. On the other hand, in some embodiments, a lower ordinal value can indicate a higher probability of an action, and a higher ordinal value can indicate a lower probability of an action.

An amount of time associated with a subject responding to the derived stimulus may also be recorded. In some embodiments, this time is associated with the overall reliability of the human observer's rating. For example, a response associated with a lower response time may be weighted higher and a response associated with a slower response time may be weighted lower.

Summary statistics of a video frame or derived stimulus is generated. These summary statistics could include measurements of the central tendency of the distribution of scores like the mean, median, or mode. They could include measurements of the heterogeneity of the scores like variance, standard deviation, skew, kurtosis, heteroskedasticity, multimodality, or uniformness. They could also include summary statistics like those above calculated from the implicit measurements of the responses listed above. The calculated summary statistics are linked to the video frame or sensor data frame associated with the responses from which they were calculated.

The summary statistics is used for training machine learning based models. The machine learning based model may be any type of supervised learning algorithm capable of predicting a continuous label for a two or three dimensional input, including but not limited to a random forest regressor, a support vector regressor, a simple neural network, a deep convolutional neural network, a recurrent neural network, a long-short-term memory (LSTM) neural network with linear or nonlinear kernels that are two dimensional or three dimensional.

In one embodiment of the model training system 112, the machine learning based model can be a deep neural network. In this embodiment the parameters are the weights attached to the connections between the artificial neurons comprising the network. Pixel data from an image in a training set collated with human observer summary statistics serves as an input to the network. This input can be transformed according to a mathematical function by each of the artificial neurons, and then the transformed information can be transmitted from that artificial neuron to other artificial neurons in the neural network. The transmission between the first artificial neuron and the subsequent neurons can be modified by the weight parameters discussed above. In this embodiment, the neural network can be organized hierarchically such that the value of each input pixel can be transformed by independent layers (e.g., 10 to 20 layers) of artificial neurons, where the inputs for neurons at a given layer come from the previous layer, and all of the outputs for a neuron (and their associated weight parameters) go to the subsequent layer. At the end of the sequence of layers, in this embodiment, the network can produce numbers that are intended to match the human summary statistics given at the input. The difference between the numbers that the network output and the human summary statistics provided at the input comprises an error signal. An algorithm (e.g., backpropagation) can be used to assign a small portion of the responsibility for the error to each of the weight parameters in the network. The weight parameters can then be adjusted such that their estimated contribution to the overall error is reduced. This process can be repeated for each image (or for each combination of pixel data and human observer summary statistics) in the training set. At the end of this process the model is "trained", which in some embodiments, means that the difference between the summary statistics output by the neural network and the summary statistics calculated from the responses of the human observers is minimized.

Figure 5:
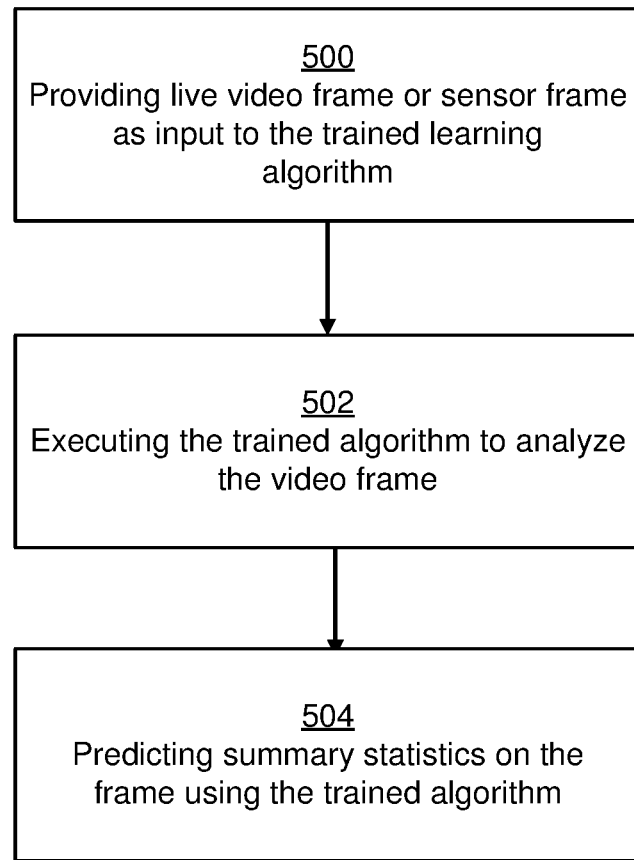
FIG. 5 is a flowchart showing a process of predicting the state of mind of road users using a trained learning algorithm, according to some embodiments of the invention.

FIG. 5. is a flowchart showing a process of predicting the state of mind of road users using a trained learning algorithm, according to some embodiments of the invention. In step 500, the training algorithm receives a "real world" or "live data" video or sensor frame. Then in step 502, the trained algorithm analyzes the frame, thus enabling the algorithm in step 504 to output a prediction of summary statistics on the frame.

The "real world" or "live data" video or other sensor frames from a car-mounted sensor are delivered to the trained learning algorithm in step 500. These frames have the same resolution, color depth and file format as the frames used to train the algorithm. These frames are delivered as individual frames or as sequences according to the format used to train the original algorithm.

Each of these frames is analyzed by being passed through the trained model in step 502. In one embodiment, the data from the frame that was passed through the model would comprise the pixel data from a camera. This data would be transformed by a trained artificial neural network. At the final stage of the processing in the artificial network, it would produce an output. This output is the model output in step 504.

The model outputs a number or set of numbers that comprise the predicted summary statistics for the "real world" or "live data" image in step 504. The predicted summary statistics are the model's best estimation of what the summary statistics would be on the image if the image had human annotations collected. The prediction is generated automatically by passing the sensor data through the model, where the information is transformed by the internal mechanisms of the model according to the parameters that were set in the training process. Because these summary statistics characterize the distribution of human responses that predict the state of mind of a road user pictured in the stimulus, the predicted statistics are therefore a prediction of the aggregate judgment of human observers of the state of mind of the pictured road user and thus an indirect prediction of the actual state of mind of the road user.

FIG. 6 is a diagram showing an example of an application of a context user prediction process in an automobile context, according to some embodiments of the invention. In this example intention 606 618 means that the road user 602 614 has the goal of moving into the path of the vehicle 600 before the vehicle 600 (on which the system is mounted) reaches their position. Awareness 604 616 in this example means that the road user 602 614 understands that the vehicle on which the system is mounted 600 is present in their vicinity. In this example, when cyclist 602 rides into the field of view of a camera mounted on vehicle 600, the pixel data of the camera image of the cyclist is fed to a trained machine learning based model as described above in step 500. The trained machine learning based model analyzes the image as described above in step 502. The trained machine learning based model predicts summary statistics as in step 504. These summary statistics are an estimate of what the summary statistics would be for a collection of human observers who were shown a derived stimulus of the camera data. The estimates summary statistics are therefore the system's best answer to the question "does this cyclist intend to enter the path of the vehicle." The vehicle is therefore able to make a guess 606 about the intention of the cyclist that is closely matched to the guess that a human driver would make in that same situation. In this example, the intention of the cyclist 606 is relatively high, as indicated by the number of horizontal bars in the display. The system installed on an automobile 600 also makes predictions about the awareness 604 of cyclists of the vehicle 600, by the same method described for intention. It also makes predictions about the willingness of an automobile 608 to yield 610 or its desire to turn across the system-containing vehicle's path 612 by the same method described above. In the case of the automobile the questions that human subjects answered that would be predicted by the algorithm are "would the vehicle be willing to yield" 610 and "does the vehicle wish to turn across your path" 612. It also makes predictions about the likelihood of pedestrians 614 to cross in front of the vehicle 618, and whether those pedestrians are aware of the vehicle 616, by the same method described above.

The models described above may be implemented as a real-time module that makes predictions of behavior of traffic entities based on input from cameras or other sensors installed on a car 600. In the case of an autonomous car, these predictions may be used to make inferences about the intent of road users such as cyclists 602, other motorists 608, and pedestrians 614 to cross into the path of the car, as well as whether the road users are aware of the car and its future path. They can also be used to predict whether other road users would be surprised, welcoming, or aggressively unwelcoming if the car were to engage in maneuvers which would take it into the path of another road user (e.g., would an oncoming car yield if the car implementing the systems and methods described herein were to turn left).

Navigating Autonomous Vehicle Based on Hidden Context

The vehicle computing system 122 predicts hidden context representing intentions and future plans of an agent (e.g., a pedestrian or a bicyclist) and use the hidden context for navigating the autonomous vehicle, for example, by adjusting the path planning of the autonomous robot based on the hidden context. For example, the vehicle computing system 122 may predict the likelihood of occurrence of future actions of pedestrians and cyclists and uses that as an input into the autonomous vehicle's motion planner. The vehicle computing system 122 may use the output of the neural network 120 to generate a motion plan which incorporates the likelihood of occurrence of future actions of pedestrians and cyclists.

The system trains a neural network 120 configured to predict one or more hidden context attributes associated with the traffic entity using the prediction engine 102. The hidden context may represent a state of mind of a person represented by the traffic entity. For example, the hidden context may represent a near term goal of the person represented by the traffic entity, for example, indicating that the person is likely to cross the street, or indicating that the person is likely to pick up an object (e.g., a wallet) dropped on the street but stay on that side of the street, or any other task that the person is likely to perform within a threshold time interval. The hidden context may represent a degree of awareness of the person about the autonomous vehicle, for example, whether a bicyclist driving in front of the autonomous vehicle is likely to be aware that the autonomous vehicle is behind the bicycle.

The vehicle computing system 122 navigates the autonomous vehicle based on the hidden context. For example, the vehicle computing system 122 may determine a safe distance from the traffic entity that the autonomous vehicle should maintain based on motion parameters of the traffic entity. The vehicle computing system 122 modulates the safe distance based on the hidden context. The vehicle computing system 122 may adjust the safe distance based on whether the near-term goal of the person indicating that the person intends to reach a location in the direction of the movement of the traffic entity or in a different direction.

For example, based on the motion parameters, the vehicle computing system 122 may determine that the autonomous vehicle can drive within X meters of the traffic entity. However, the hidden context indicates that the person represented by the traffic entity intends to cross the street in a direction different from the direction indicated by the motion parameters. In this situation, the vehicle computing system 122 adjusts the safe distance such that the autonomous vehicle is able to drive closer to the traffic entity than the distance X. On the other hand, if the hidden context indicates that the person represented by the traffic entity intends to cross the street in a direction same as the direction indicated by the motion parameters, the vehicle computing system 122 adjusts the safe distance such that the autonomous vehicle maintains a distance greater than X from the traffic entity.

Overall Process of Navigating an Autonomous Vehicle Through Traffic

Figure 7:
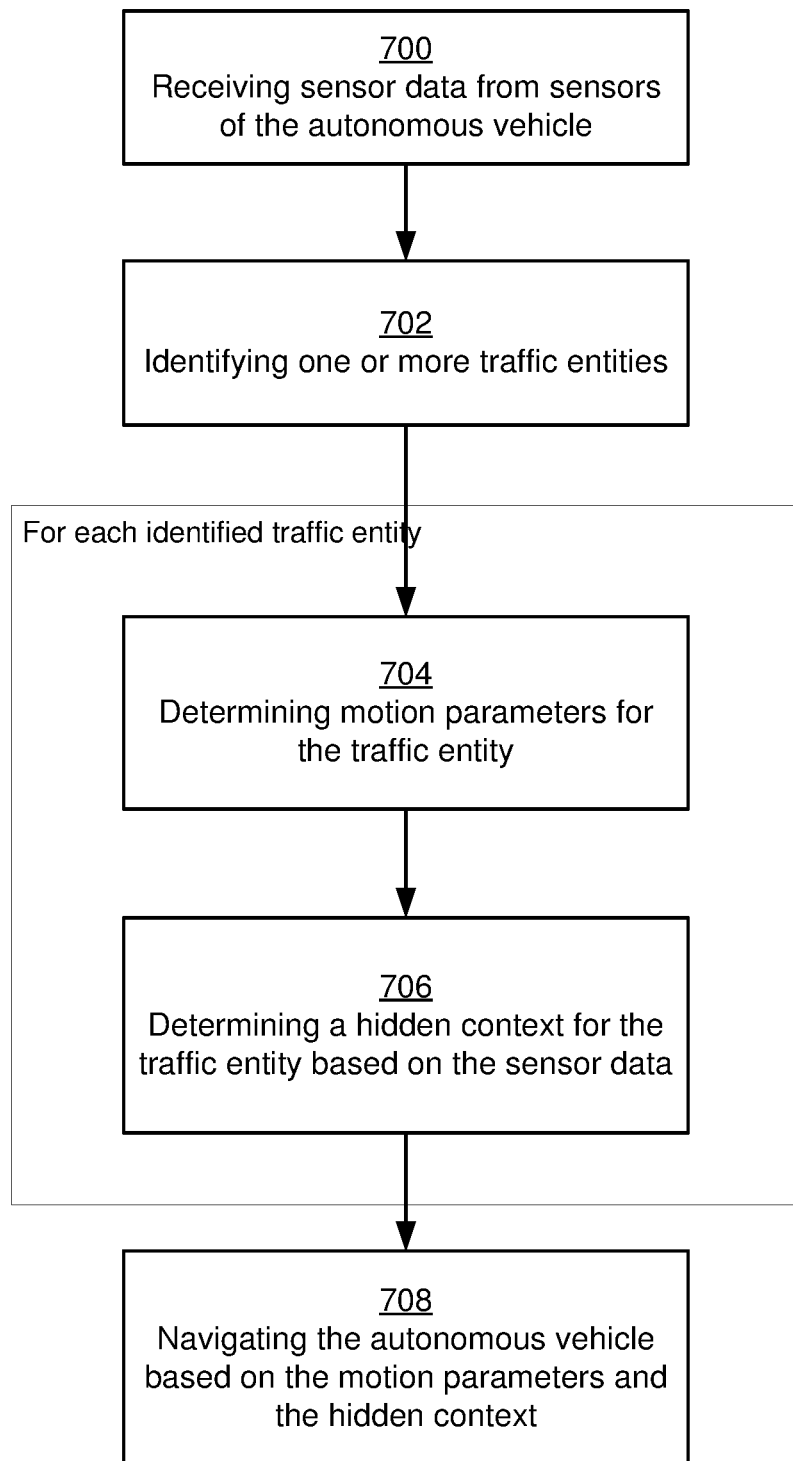
FIG. 7 represents a flowchart illustrating the process of navigating the autonomous vehicle based on hidden context, according to an embodiment.

FIG. 7 represents a flowchart illustrating the process of navigating the autonomous vehicle based on hidden context, according to an embodiment. The vehicle computing system 122 receives 700 sensor data from sensors of the autonomous vehicle. For example, the vehicle computing system 122 may receive lidar scans from lidars and camera images from cameras mounted on the autonomous vehicle. In an embodiment, the vehicle computing system 122 builds a point cloud representation of the surroundings of the autonomous vehicle based on the sensor data. The point cloud representation includes coordinates of points surrounding the vehicle, for example, three dimensional points and parameters describing each point, for example, the color, intensity, and so on.

The vehicle computing system 122 identifies 702 one or more traffic entities based on the sensor data, for example, pedestrians, bicyclists, or other vehicles driving in the traffic. The traffic entities represent non-stationary objects in the surroundings of the autonomous vehicle.

In an embodiment, the autonomous vehicle obtains a map of the region through which the autonomous vehicle is driving. The autonomous vehicle may obtain the map from a server. The map may include a point cloud representation of the region around the autonomous vehicle. The autonomous vehicle performs localization to determine the location of the autonomous vehicle in the map and accordingly determines the stationary objects in the point cloud surrounding the autonomous vehicle. The autonomous vehicle may superimpose representations of traffic entities on the point cloud representation generated.

The vehicle computing system 122 repeats the following steps 704 and 706 for each identified traffic entity. The vehicle computing system 122 determines 704 motion parameters for the traffic entity, for example, speed and direction of movement of the traffic entity. The vehicle computing system 122 also determines 706 a hidden context associated with the traffic entity using the prediction engine 114. The vehicle computing system 122 determines a measure of uncertainty for the hidden context using the probabilistic neural network.

The vehicle computing system 122 navigates 708 the autonomous vehicle based on the motion parameters, the hidden context, and the measure of uncertainty. For example, the vehicle computing system 122 may determine a safe distance from the traffic entity that the autonomous vehicle should maintain based on the motion parameters of the traffic entity. The safe distance is also referred to as a threshold distance, such that the autonomous vehicle navigates to stay at least the threshold distance away from a traffic entity observed in the traffic. The vehicle computing system 122 modulates the safe distance based on the hidden context. The vehicle computing system 122 may adjust the safe distance based on whether the near-term goal of the person indicating that the person intends to reach a location in the direction of the movement of the traffic entity or in a different direction. For example, based on the motion parameters, the vehicle computing system 122 may determine that the autonomous vehicle can drive within X meters of the traffic entity. However, the hidden context indicates that the person represented by the traffic entity intends to cross the street in a direction different from the direction indicated by the motion parameters. In this situation, the vehicle computing system 122 adjusts the safe distance such that the autonomous vehicle is able to drive closer to the traffic entity than the distance X. On the other hand, if the hidden context indicates that the person represented by the traffic entity intends to cross the street in a direction same as the direction indicated by the motion parameters, the vehicle computing system 122 adjusts the safe distance such that the autonomous vehicle maintains a distance greater than X from the traffic entity.

The vehicle computing system 122 modulates the safe distance based on the measure of uncertainty for the output values. In cases where the measure of uncertainty is very high, the vehicle computing system 122 increases the safe distance from the traffic entity by certain factor. In cases where the measure of uncertainty is very low, the vehicle computing system 122 does not adjust the safe distance from the traffic entity or increases the safe distance from the traffic entity by a much smaller factor. Accordingly, the vehicle computing system 122 determines the safe distance to be a value directly related to the measure of uncertainty generated by the neural network. For example, the factor by which the safe distance is increased is a value directly proportional to a degree of uncertainty of the output.

Overall Process of Training Neural Network

Figure 8:
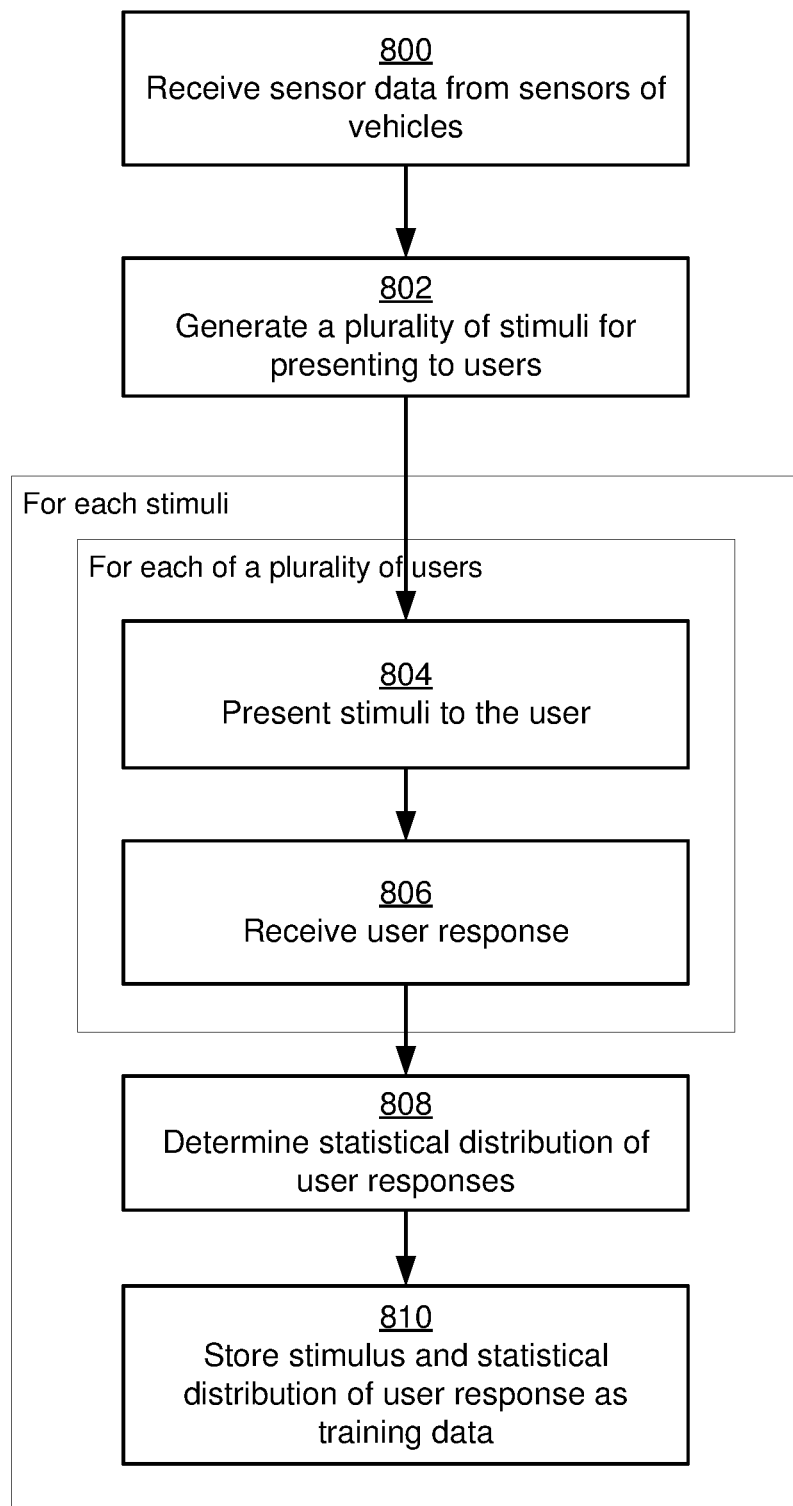
FIG. 8 represents a flowchart illustrating the process of generating training data set for training of neural network illustrated in FIG. 2, according to an embodiment.

FIG. 8 represents a flowchart illustrating the process of generating training data set for training of neural network illustrated in FIG. 1B, according to an embodiment. The steps illustrated in the flowchart may be performed in an order different from that illustrated in FIG. 8. For example, certain steps may be performed in parallel. The steps may be performed by modules other than those indicated herein.

The vehicle computing system 122 receives 800 sensor data from sensors of the autonomous vehicle. For example, the vehicle computing system 122 may receive lidar scans from lidars and camera images from cameras mounted on the autonomous vehicle. The vehicle computing system 122 provides the sensor data to the server 106 which provides the sensor data to the model training system 82. The server 106 identifies one or more traffic entities based on the sensor data, for example, pedestrians, bicyclists, or other vehicles driving in the traffic. The traffic entities represent non-stationary objects in the surroundings of the autonomous vehicle.

The server 106 determines stimuli for presenting to users. A stimulus may be an image, for example, a video frame showing a traffic entity. A stimulus may be a video, for example, a portion of a video showing a traffic entity. In an embodiment, the server 106 identifies a bounding box surrounding a video frame or image and may present only the portion of the video frame or image within the bounding box to a user.

The server 106 repeats the following steps for each stimulus. The server 106 presents 804 the stimuli to users with request to provide user responses describing some hidden context attribute of the traffic entity, for example, state of mind of a pedestrian/bicyclist or a measure of awareness of a vehicle by a pedestrian or bicyclist. The stimuli are presented to users via a user interface, for example, via a webpage of a website. The server 106 repeats the step of presenting 804 and receiving 806 user responses for each of a plurality of users.

The server 106 determines 808 a statistical distribution of user responses. For example, the statistical distribution may comprise a mean value and a standard deviation value. In an embodiment, each user response represents an ordinal value from a plurality of ordinal values. The server 106 determines a histogram indicating, for each of the ordinal values, a likelihood of receiving a user response having that ordinal value. The server 106 may determine the histogram based on a frequency of occurrence of each ordinal value determined based on the number of users that provided each ordinal value. The server 106 may normalize the frequency of occurrence of each ordinal value by dividing number of users that provided each ordinal value by the total number of users that provided user responses. The system determines a cumulative histogram for the video frame. The cumulative histogram value corresponding to an ordinal value represents an aggregate of histogram values corresponding to each of the plurality of ordinal values that are less than or equal to the ordinal value. The server 106 stores 810 the stimulus and corresponding statistical distribution of user responses as training data set for training of the neural network 120. The server 106 provides the training data set to the model training system 112.

The model training system 112 performs the following steps to train the neural network 120. The model training system 112 repeats the steps for each image/video frame or video stored in the training data set. The model training system 112 provides a video frame as input to the neural network 120. The video frame may be encoded for example, as an array of pixel data. Each pixel data may comprise the position of the pixel in the image and one or more values, for example, color of the pixel.

The model training system 112 executes the neural network 120 to generate outputs. The model training system 112 repeatedly executes the neural network 120. As part of execution, the feature extraction component 125 of the neural network 120 generates 1215 a feature vector. The model training system 112 determines 1225 statistical distribution of the predicted output values. The model training system 112 compares 1230 the statistical distribution of the predicted output values with the statistical distribution of the user responses received by presenting the video frame to users as a stimulus. The model training system 112 determines a loss function value based on the statistical distribution of the predicted output values with the statistical distribution of the user responses. The model training system 112 adjusts the parameters of the neural network 120 by performing back propagation to minimize the loss function.

The trained neural network is provided to the vehicle computing system 122 for use in navigating the autonomous vehicle. The autonomous vehicle receives sensor data, for example, camera images/video frames as the autonomous vehicle drives through traffic. The vehicle computing system 122 identifies traffic entities in the images/video frames. The vehicle computing system 122 preprocesses the video frames if necessary, for example, to select a portion of the video frame showing a bounding box around the traffic entity and provides the preprocessed video frame to the neural network 120 as input. The vehicle computing system 122 executes the neural network to generate outputs indicating values of hidden context attributes and uncertainty values associated with the predicted outputs. The vehicle computing system 122 uses the output of the neural network 122 to navigate the autonomous vehicle through the traffic. In an embodiment, the vehicle computing system 122 uses the output generated by the neural network to generate control signals provided to the controls of the vehicle, for example, braking system, accelerator, steering, and so on.

Loss Function for Machine Learning

In an embodiment, the hidden context attribute represents ordinal data, i.e., data that has a plurality of values with an order between the values. For example, the ordinal values can be low, medium, high that have an order between the values i.e., low indicates a value less than medium and medium indicates a value less than high. The number of distinct ordinal values could be any number greater than one, for example, two, three, four, five, and so on. Examples of sets of ordinal values include {1, 2, 3, 4} and {A, B, C, D, E}.

Ordinal data is distinct from categorical data since distinct ordinal values have an inherent order between them whereas categorical data has no order between distinct values. For example, if the set {A, B, C, D, E} represents categorical values, the difference between categories A and B categories is likely to be similar to a difference between A and E categories. However, if the set {A, B, C, D, E} represents ordinal values, the difference between categories A and B ordinal values is less than the difference between A and E ordinal values since the values are ordered. Furthermore, each ordinal value has a particular significance, for example, if the set {A, B, C, D, E} represents user responses, the response E may indicate that a user is unlikely to cross a street whereas response A may indicate that the user is very likely to cross the street. In an embodiment, the system represents the ordinal values as ordered categories.

A machine learning based model, for example, a neural network is configured to receive an input video frame captured by a vehicle and determine a hidden context attribute associated with a traffic entity shown in the input video frame. Examples of hidden context attributes include a likelihood that a pedestrian would cross the street and get in front of the vehicle or a likelihood that a traffic entity (e.g., a pedestrian or a bicyclist or a driver of a motor vehicle) is aware of the presence of the vehicle from which the video frame was captured. In an embodiment, the value of the hidden context attribute is determined by presenting the video frame to several users along with a question describing the hidden context attribute. For example, the question may ask "what is the likelihood that the person shown in this video/image is going to cross the street?" The user may be presented with a set of values, for example, 1, 2, 3, 4, . . . , N and asked to indicate on a scale of 1 to N what the answer is according to the user.

In an embodiment, the user may be presented with a user interface including a widget that allows the user to select an ordinal value from a set of ordinal values, for example, the user interface may display a radio button displaying the various ordinal values and allowing a user to select a particular ordinal value. Alternatively, the user interface may present a drop-down list that shows all the ordinal values and allows the user to select one of the ordinal values. Alternatively, the user interface may present the user with a textbox that the user may use to enter an ordinal value.

The system generates a histogram based on the responses received from a plurality of users. In an embodiment, the histogram comprises, for each possible ordinal value of the response, a total number of user responses that provided that ordinal value as the answer. The system may normalize the values so that each value corresponding to an ordinal value of the response represents a likelihood of receiving a user response having that ordinal value as an answer. The likelihood of occurrence of each ordinal value in a user response may be represented as a percentage value such that the sum of likelihood of occurrence for all ordinal values is 100. Alternatively, the likelihood of occurrence of each ordinal value in a user response may be represented as a fractional value (probability) such that the sum of likelihood of occurrence for all ordinal values is 1.

In an embodiment, a neural network predicts a vector of ordinal values, each element of the vector representing a likelihood that a user would provide that particular ordinal value as a response if presented with the video or video frame and a question. The system trains the neural network using training data comprising values of the ordinal vector determined using user responses corresponding to videos/video frames presented to users. The system executes the neural network for a given input video frame to determine an output vector, wherein each output vector value represents a predicted likelihood of a corresponding ordinal value. The system determines a loss value base on a comparison of the output vector and a corresponding vector obtained by actual user responses.

In an embodiment, the loss value is determined using a loss function that involves the following computation. The system determines a cumulative histogram (or cumulative distribution function (CDF)) for each of the predicted output vector and the expected output vector. The cumulative histogram value for the $i^{th}$ element of a vector is determined by adding all the vector elements that have indexes from 1 to i. For example, the cumulative histogram value for the $3^{rd}$ element is the sum of the first three elements of the vector, the cumulative histogram value for the $4^{th}$ element is the sum of the first four elements of the vector, cumulative histogram value for the $5^{th}$ element is the sum of the first five elements of the vector, and so on. For example, the following equations shows how the $k^{th}$ index of the cumulative histogram indicated as $CV_k$ is determined from the individual values of the histogram indicated as $V_i$.

$$CV_k = \sum_{i=1}^{k} V_i$$

The system determines the loss value as the sum of the absolute values of the differences between each element of the predicted output vector and the expected vector based on user responses. The following equation shows how the loss value L is determined using the loss function according to an embodiment. The value $CV_i$ is the cumulative histogram corresponding to the $i^{th}$ ordinal value of the predicted output vector and the value $CU_i$ is the cumulative histogram corresponding to the $i^{th}$ ordinal value of the expected vector as determined based on the user responses for the training data. The mod operator |x| determines the absolute value of the input x.

$$L = \sum_{i=1}^{N} |CV_i - CU_i|$$

The above equation represents an L1 norm (sum of absolute values) based on the differences between the cumulative histogram values. Other embodiments can use other norms, for example, the L2 norm. Accordingly, the loss L is determined as a function of the sum of the squares of the differences ($CV_i - CU_i$).

$$L = \sqrt{\sum_{i=1}^{N}(CV_i - CU_i)^2}$$

In an embodiment, the system normalizes the vector values representing the output results of the neural network and the vector representing the expected output based on user responses. The normalization may be performed across a training data set to allow comparison of values across different samples and training runs. The normalization may be performed by determining an aggregate value across a set of samples and then dividing individual values by the aggregate value.

In an embodiment, the loss value represents the area between two curves, a curve C1 representing the cumulative histogram of the predicted output vector and a curve C2 representing the cumulative histogram of the expected output vector as determined based on actual user responses. In an embodiment, the loss value is determined using an earth mover's distance metric between the two vectors, a vector V1 representing the predicted output by the neural network and a vector V2 representing the expected output vector as determined based on actual user responses.

The system trains the neural network using the loss value determined. Accordingly, the system adjusts the weights of the neural network to minimize the loss value for the training data. The system uses the trained neural network to predict ordinal values for corresponding hidden context attribute as a vehicle drives, for example, for an autonomous vehicle to determine values of signals to provide to the controls of the autonomous vehicle.

Although embodiments described herein refer to video frames presented to users or provided as input to a neural network, the techniques can be applied to images or videos. Furthermore, although the embodiments describe training of neural networks, the loss function described herein can be used for training other types of machine learning based models used in navigation of autonomous vehicle.

Figure 9:
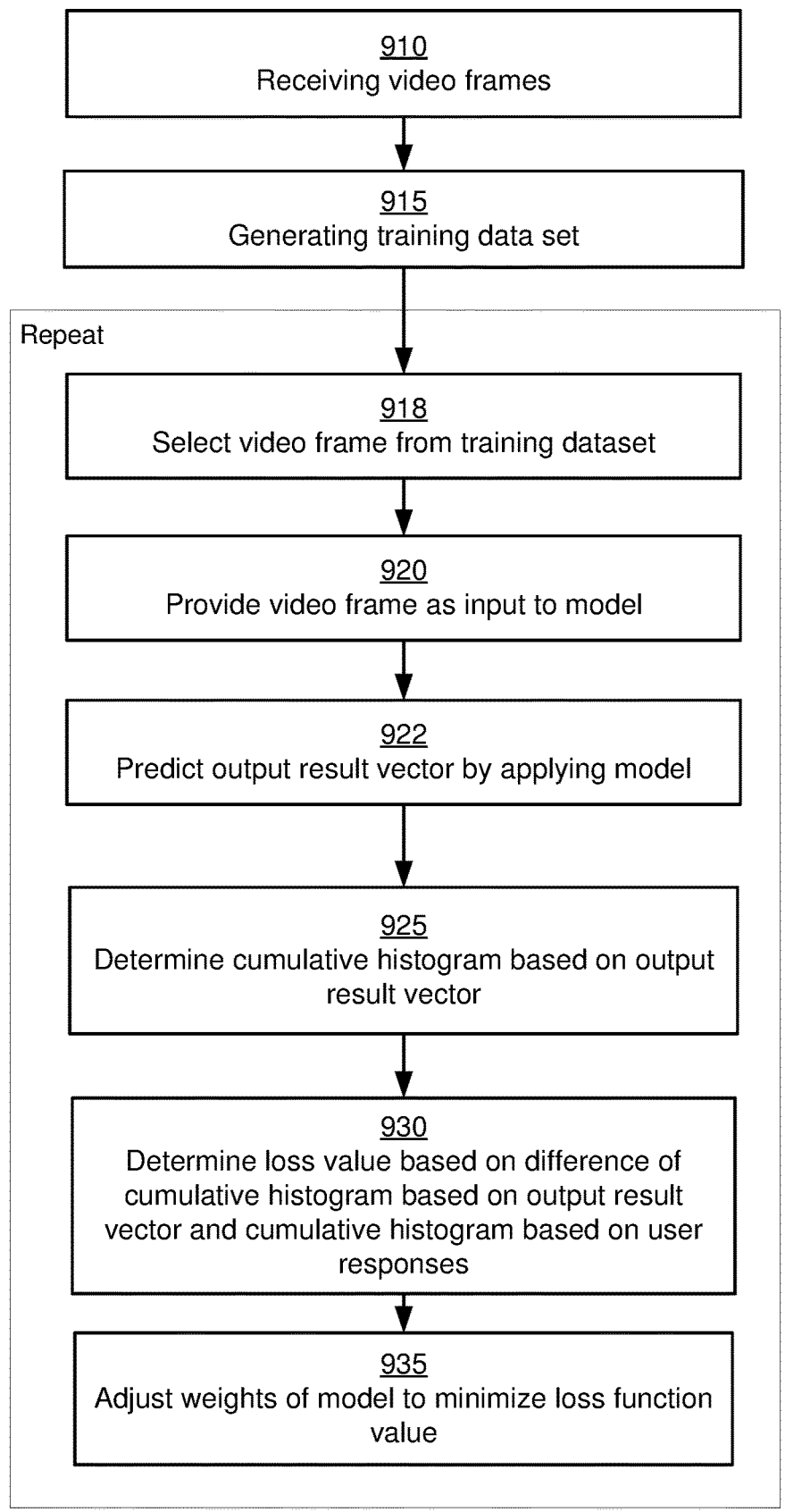
FIG. 9 shows a flowchart representing a process for training a model using the loss functions described herein, according to an embodiment.

FIG. 9 shows a flowchart representing a process for training a model using the loss functions described herein, according to an embodiment.

The system receives 910 and stores video frames obtained from videos captured by cameras mounted on vehicles. Each video frame displays a traffic entity, for example, a pedestrian, a bicyclist, or any other moveable object in a traffic through which the vehicle was driving while capturing the video frame. The system presents stimuli based on the video frames according to the processes illustrated in FIG. 8 to determine statistical distribution of user responses for an ordinal output corresponding to each video frame. According to an embodiment, the statistical distribution represents a cumulative histogram of the ordinal values representing the user responses.

The system generates 915 training data set based on the video frames. The training data set comprises, for each video frame, a vector representing a likelihood of receiving a user response for each of the plurality of ordinal values. The system trains a model, for example, a neural network using the training data set. The model is configured to receive a video frame as input and output a vector, wherein each element of the vector corresponds to an ordinal value and represents a likelihood of receiving a user response having that ordinal value.

The system performs training of the model by repeating the following steps. The system selects 918 a video frame from the training data set. The system provides 920 the video frame selected from the training data set as input to the model. The system predicts 922 an output result vector using the model. Each element of the output result vector corresponds to an ordinal value and represents a predicted likelihood of receiving a user response having that ordinal value.

The system determines 925 a cumulative histogram based on the output result vector. The system determines 930 a loss value as a measure of difference between the cumulative histogram based on the output result vector and a cumulative histogram corresponding to the video frame determined based on the user responses. The system adjusts 935 the weights of the model to minimize the loss function.

Filtering User Responses for Generating Training Data

The system generates training data based on user responses received from users presented with video frames and corresponding questions. The system receives multiple user responses for each video frame and aggregates the user responses. The aggerate values based on the user responses are associated with the corresponding video frames. The video frames and the associated aggregate user responses are used as training data for training machine learning based models. Although the techniques described herein refer to video frames, the techniques can be applied to any kind of images.

The system determines with a high likelihood, whether the user provided a good response or a bad response, i.e., invalid user response. A good response may be referred to as a valid response and a bad response may be referred to as an invalid response. The system stores the good user responses to generate the training data set and filters out (or excludes) the bad user responses. The system filters out the bad user responses and excludes them from the training data set. A bad user response is a user response that is unlikely to represent a correct answer to the question presented with the video frame to the user. For example, some users may provide user responses without actually analyzing or even reviewing the stimuli presented to them. Such users may simply click on arbitrary values and provide them as responses. This may happen if users are compensated based on the number of responses they provide and the users may simply be interested in increasing the total number of responses to get compensated rather than providing accurate responses. Such user responses are not useful for the system since they do not represent meaningful information.

Examples of bad user responses are as follows. A bad user response may be provided by the user without paying attention to the question or the video frame. A user may answer a question presented to the user along with a video frame too fast to provide a meaningful answer. For example, a user may provide an answer even before the video frame (or video) is fully displayed/loaded in the user interface or before the question is displayed. A user may let the video frame display but provide random answers without paying attention to the question or without putting in proper thought into answering the question.

The system identifies such user responses that represents bad user input and removes these responses to improve the quality of training data set used for training machine learning models. Accordingly, any machine learning models such as neural networks trained using the training data set are likely to generate higher quality results comparted to models trained using training data set that includes all user responses including the bad user responses.

Figure 10:
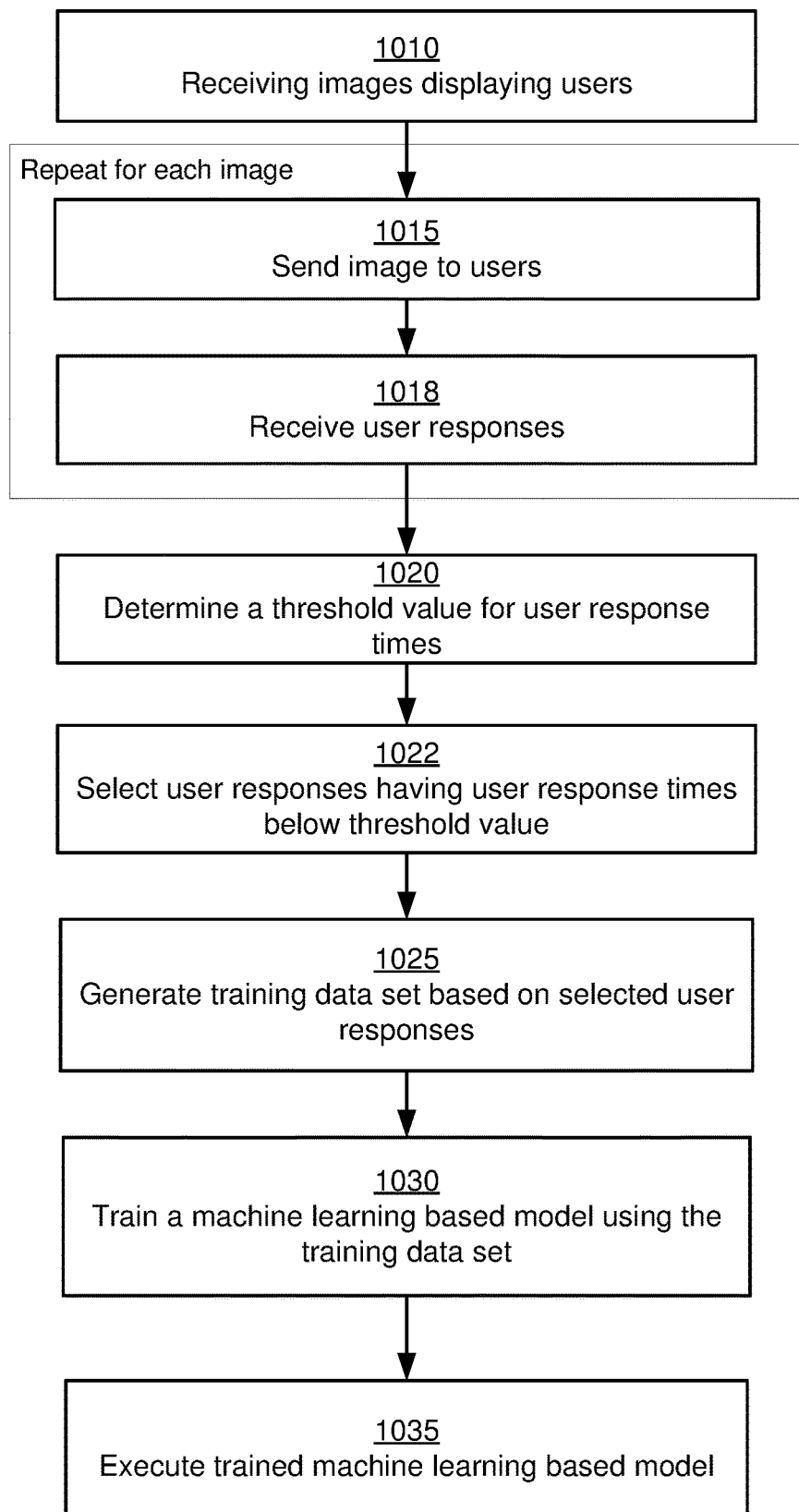
FIG. 10 shows a flowchart representing a process for filtering user responses for use as training data set for training machine learning based models, according to an embodiment.

FIG. 10 shows a flowchart representing a process for filtering user responses for use as training data set for training machine learning based models, according to an embodiment. The steps of the processes illustrated herein may be executed in an order different from that indicated in the flowcharts illustrated in the figures.

The system receives images displaying users, for example, images displaying traffic entities. The images may represent video frames of videos captured by cameras. The images may be captured by vehicles, for example, autonomous vehicles driving through traffic. However, the techniques disclosed herein can be used for any kind of images. The system repeats the steps 1015 and 1018 for each image. The system sends 1015 the image to a set of users. The images may be sent for display via a user interface. The images are typically displayed along with one or more questions describing a hidden context attribute and requesting the user to provide a response. In an embodiment, the response is an ordinal value, for example, a value from 1 to 5.

Each user response is associated with a user response time. The system determines a user response time for each user response. The user response time is indicative of the time taken by a user to provide a response to a video frame and question presented to the user via a user interface. For example, the system may determine the user response time as a difference $(T_x-T_y)$ between the time $T_x$ when the system receives the user response and the time $T_y$ when the system sends the video frame and the associated question to the user via a user interface.

The system determines 1020 a threshold user response time T such that a statistical distribution of user responses with user response times below the threshold user response time T is significantly different compared to the statistical distribution of user responses with user response time above the threshold user response time T. The system determines statistical distribution D1 of user responses with user response time below threshold T and the statistical distribution D2 of user responses with user response time above the threshold T. The system determines a measure of difference between the statistical distribution D1 and D2. If the measure of difference between statistical distributions D1 and D2 indicates more than a threshold difference between the two statistical distributions, the system determines that the user responses with user response time below threshold T are bad user responses. The system eliminates user responses determined to be bad responses and determines the training data set based on user responses with user response time above the threshold T.

In an embodiment, the system identifies a plurality of threshold user response time values. For each of the plurality of threshold user response time values, the system determines the statistical distribution D1 of user responses with user response time below threshold T and the statistical distribution D2 of user responses with user response time above the threshold T. For each of the plurality of threshold user response time values, the system determines a measure of difference between the statistical distribution D1 and D2.

The system selects the threshold user response time based on the measure of difference between the statistical distribution D1 and D2. For example, the system selects the threshold user response time for which the measure of difference between the statistical distribution D1 and D2 indicates more than a threshold difference between the statistical distribution D1 and D2. The system eliminates user responses with user response time below the selected threshold user response time as bad responses and determines the training data set based on user responses with user response time above the selected threshold user response time. If there are multiple threshold user response time values that have more than a threshold difference between the statistical distribution D1 and D2, the system selects the highest threshold user response time value that has more than a threshold difference between the statistical distribution D1 and D2.

In an embodiment, the system measures the statistical distribution as a histogram representing the frequency of occurrence of each of the plurality of distinct values in user responses. The system determines a measure of difference between two histograms (or a measure of a distance between two histograms) by determining differences between frequency of occurrence of each distinct value and aggregating the difference values.

In an embodiment, the system determines the measure of difference between two histograms as the sum of the absolute values of the differences between each frequency of occurrence of each distinct value. The following equation shows how the system determines the measure of difference D between two histograms H1 and H2 according to an embodiment. The value $V_i$ is the frequency of occurrence of the $i^{th}$ distinct ordinal value according to histogram H1 and the value $U_i$ is the frequency of occurrence of the $i^{th}$ distinct ordinal value according to histogram H2. The mod operator |x| determines the absolute value of the input x.

$$D = \sum_{i=1}^{N} |V_i - U_i|$$

The above equation represents an L1 norm (sum of absolute values) based on the differences between the histogram values. Other embodiments use other norms, for example, the L2 norm. Accordingly, the system determines the measure of difference between histograms H1 and H2 as a function of the sum of the squares of the differences $(V_i-U_i)$.

$$D = \sqrt{\sum_{i=1}^{N} (V_i - U_i)^2}$$

The system selects 1022 user responses having user response times below the threshold value. In an embodiment, the system identifies users that consistently provide user responses that have user response time below the threshold value. The system eliminates all user responses provided by these users. The system may stop sending images to these users for requesting their user responses. In an embodiment, the system blacklists these users so that these users are not allowed to provide user responses.

The system generates 1025 a training data set based on the user responses. The system trains a machine learning based model, for example, a neural network for predicting hidden context attributes for use in navigation of autonomous vehicles. The neural network may be executed, for example, for navigation of an autonomous vehicle.

The techniques disclosed herein for eliminating bad user responses maybe used for analyzing use responses to any question presented to users via a user interface. The techniques allow a system to determine statistical distribution of valid user responses, for example, for displaying via a user interface.

The techniques disclosed herein for eliminating bad user responses maybe used for generating training data for machine learning based models for predicting any attribute describing an entity displayed in an image. The techniques disclosed herein for eliminating bad user responses maybe used for other purposes, for example, to determine statistical distribution of user responses, for example, for displaying via a user interface.

The techniques disclosed herein may be used for eliminating bad user responses used for any psychophysics framework that receives and analyzes user responses. Such data may be used for training machine learning models, for example, neural networks for various purposes. For example, the machine learning model may be trained to predict user behavior in response to neighboring moving objects such as robot arms, forklifts, delivery robots, drones, and so on. The techniques disclosed for filtering out bad user responses can be used for any process that receives and analyzes user responses for example, a system that receives user responses based on a survey, poll, voting, or questionnaire filled out by users.

Computing Machine Architecture

Figure 11:
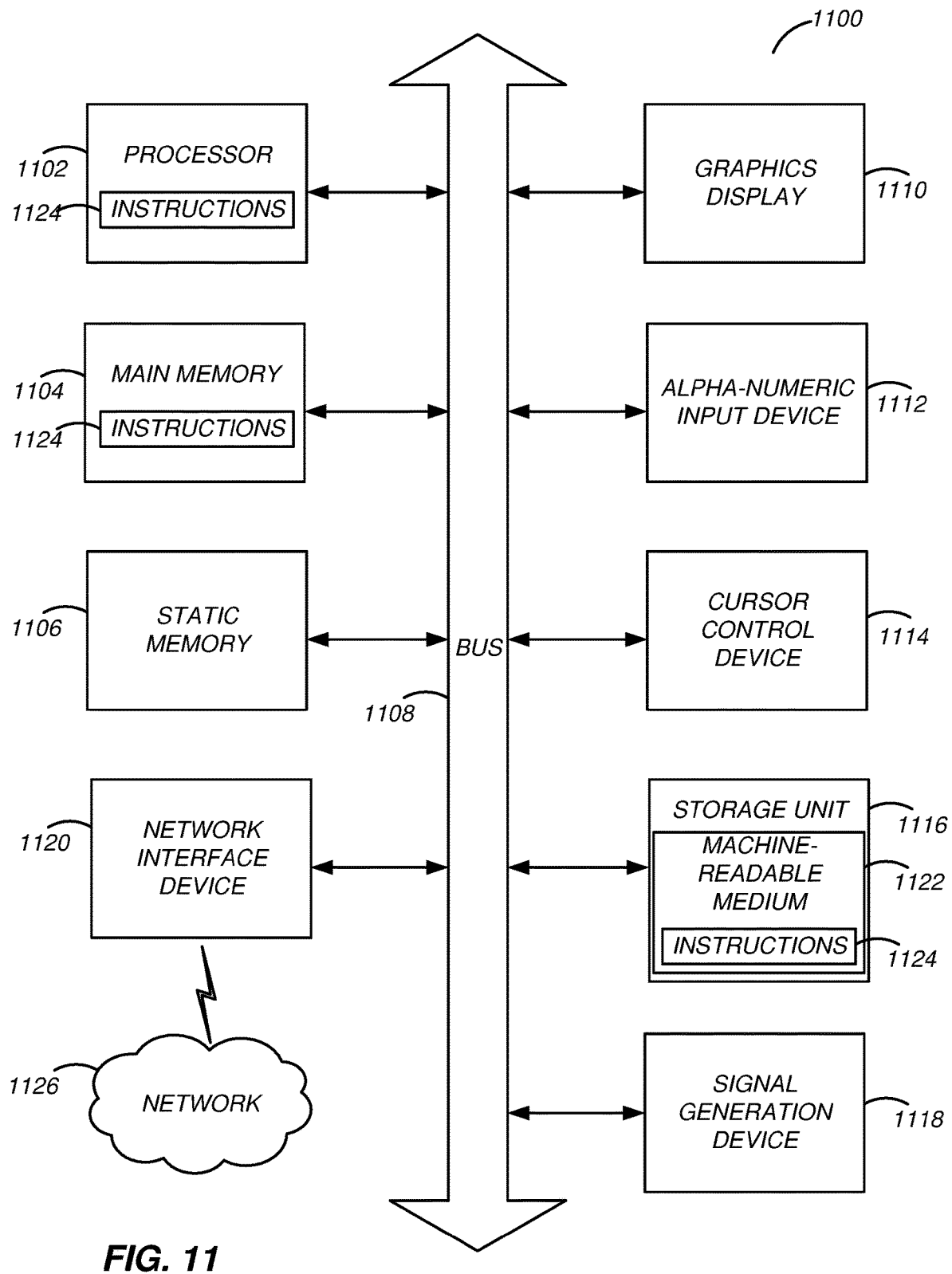
FIG. 11 is a block diagram illustrating components of an example machine able to read instructions from a machine-readable medium and execute them in a processor (or controller).

FIG. 11 is a block diagram illustrating components of an example machine able to read instructions from a machine-readable medium and execute them in a processor (or controller). Specifically, FIG. 11 shows a diagrammatic representation of a machine in the example form of a computer system 1100 within which instructions 1124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes a processor 1102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1104, and a static memory 1106, which are configured to communicate with each other via a bus 1108. The computer system 1100 may further include graphics display unit 1110 (e.g., a plasma display panel (PDP), a liquid crystal display (LCD), a projector, or a cathode ray tube (CRT)). The computer system 1100 may also include alphanumeric input device 1112 (e.g., a keyboard), a cursor control device 1114 (e.g., a mouse, a trackball, a joystick, a motion sensor, or other pointing instrument), a storage unit 1116, a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 (e.g., software) may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 (e.g., software) may be transmitted or received over a network 1126 via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 1124) for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

For every flowchart presented herein in the figures, the steps illustrated in the flowchart may be performed in an order different from that illustrated in the figure. For example, certain steps may be performed in parallel. The steps may be performed by modules other than those indicated herein.

Although embodiments disclosed describe techniques for navigating autonomous vehicles, the techniques disclosed are applicable to any mobile apparatus, for example, a robot, a delivery vehicle, a drone, and so on.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device) or in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

I claim:

1. A computer-implemented method comprising: receiving, by an autonomous vehicle, sensor data from sensors mounted on the autonomous vehicle; storing a plurality of video frames, each video frame displaying a traffic entity; generating training data set comprising the plurality of video frames and for each video frame, a vector representing a likelihood of receiving a user response for each of a plurality of ordinal values; training a neural network using the training data set, the neural network configured to receive a video frame as input and output a vector, wherein each element of the vector represents a likelihood of receiving user responses having that ordinal value, the training of the neural network comprising, determining a loss value for each input video frame, the determining comprising: providing a video frame from the training data set as input to the neural network; predicting an output result vector using the neural network; determining a cumulative histogram based on the output result vector; determining a loss value as a measure of difference between the cumulative histogram based on the output result vector and a cumulative histogram corresponding to the video frame determined based on the user responses; and adjusting weights of the neural network to minimize the loss value; and navigating an autonomous vehicle, based on the neural network.

2. The method of claim 1, further comprising:
for each of the plurality of video frames, the video frame displaying a traffic entity:
sending the video frame for presentation to a set of users;
for each of the set of users, receiving a user response describing a hidden context attribute for the traffic entity, the user response comprising an ordinal value from a plurality of ordinal values;
determining a histogram indicating for each of the ordinal values, a likelihood of receiving a user response having that ordinal value.

3. The method of claim 2, further comprising:
for each of the plurality of video frames, the video frame displaying a traffic entity:
determining a cumulative histogram for the video frame, wherein the cumulative histogram value corresponding to an ordinal value represents an aggregate of histogram values corresponding to each of the plurality of ordinal values that are less than or equal to the ordinal value.

4. The method of claim 2, wherein the hidden context represents a state of mind of a user represented by the traffic entity.

5. The method of claim 2, wherein the hidden context represents a task that a user represented by the traffic entity is planning on accomplishing.

6. The method of claim 2, wherein the hidden context represents a degree of awareness of the autonomous vehicle by a user represented by the traffic entity.

7. The method of claim 2, wherein the hidden context represents a goal of a user represented by the traffic entity, wherein the user expects to achieve the goal within a threshold time interval.

8. The method of claim 1, wherein navigating the autonomous vehicle comprises:
   capturing a video frame;
   providing the video frame as input to the neural network; and
   determining signals sent to controls of the autonomous vehicle based on the output of the neural network.

9. A non-transitory computer readable storage medium storing instructions that when executed by a computer processor, cause the computer processor to perform steps comprising: receiving, by an autonomous vehicle, sensor data from sensors mounted on the autonomous vehicle; storing a plurality of video frames, each video frame displaying a traffic entity; generating training data set comprising the plurality of video frames and for each video frame, a vector representing a likelihood of receiving a user response for each of a plurality of ordinal values; training a neural network using the training data set, the neural network configured to receive a video frame as input and output a vector, wherein each element of the vector represents a likelihood of receiving user responses having that ordinal value, the training of the neural network comprising, determining a loss value for each input video frame, the determining comprising: providing a video frame from the training data set as input to the neural network; predicting an output result vector using the neural network; determining a cumulative histogram based on the output result vector; determining a loss value as a measure of difference between the cumulative histogram based on the output result vector and a cumulative histogram corresponding to the video frame determined based on the user responses; and adjusting weights of the neural network to minimize the loss value; and navigating an autonomous vehicle, based on the neural network.

10. The non-transitory computer readable storage medium of claim 9, wherein the instructions further cause the computer processor to perform steps comprising:
    for each of the plurality of video frames, the video frame displaying a traffic entity:
        sending the video frame for presentation to a set of users;
        for each of the set of users, receiving a user response describing a hidden context attribute for the traffic entity, the user response comprising an ordinal value from a plurality of ordinal values;
        determining a histogram indicating for each of the ordinal values, a likelihood of receiving a user response having that ordinal value.

11. The non-transitory computer readable storage medium of claim 10, wherein the instructions further cause the computer processor to perform steps comprising:
    for each of the plurality of video frames, the video frame displaying a traffic entity:
        determining a cumulative histogram for the video frame, wherein the cumulative histogram value corresponding to an ordinal value represents an aggregate of histogram values corresponding to each of the plurality of ordinal values that are less than or equal to the ordinal value.

12. The non-transitory computer readable storage medium of claim 10, wherein the hidden context represents a state of mind of a user represented by the traffic entity.

13. The non-transitory computer readable storage medium of claim 10, wherein the hidden context represents a task that a user represented by the traffic entity is planning on accomplishing.

14. The non-transitory computer readable storage medium of claim 10, wherein the hidden context represents a degree of awareness of the autonomous vehicle by a user represented by the traffic entity.

15. The non-transitory computer readable storage medium of claim 10, wherein the hidden context represents a goal of a user represented by the traffic entity, wherein the user expects to achieve the goal within a threshold time interval.

16. The non-transitory computer readable storage medium of claim 10, wherein the instructions for navigating the autonomous vehicle cause the computer processor to perform steps comprising:
    capturing a video frame;
    providing the video frame as input to the neural network; and
    determining signals sent to controls of the autonomous vehicle based on the output of the neural network.

17. A computer system comprising: a computer processor; and a non-transitory computer readable storage medium storing instructions that when executed by a computer processor, cause the computer processor to perform steps comprising: receiving, by an autonomous vehicle, sensor data from sensors mounted on the autonomous vehicle; storing a plurality of video frames, each video frame displaying a traffic entity; generating training data set comprising the plurality of video frames and for each video frame, a vector representing a likelihood of receiving a user response for each of a plurality of ordinal values; training a neural network using the training data set, the neural network configured to receive a video frame as input and output a vector, wherein each element of the vector represents a likelihood of receiving user responses having that ordinal value, the training of the neural network comprising, determining a loss value for each input video frame, the determining comprising: providing a video frame from the training data set as input to the neural network; predicting an output result vector using the neural network; determining a cumulative histogram based on the output result vector; determining a loss value as a measure of difference between the cumulative histogram based on the output result vector and a cumulative histogram corresponding to the video frame determined based on the user responses; and adjusting weights of the neural network to minimize the loss value; and navigating an autonomous vehicle, based on the neural network.

18. The computer system of claim 17, wherein the instructions further cause the computer processor to perform steps comprising:
    for each of the plurality of video frames, the video frame displaying a traffic entity:
        sending the video frame for presentation to a set of users;
        for each of the set of users, receiving a user response describing a hidden context attribute for the traffic entity, the user response comprising an ordinal value from a plurality of ordinal values;

determining a histogram indicating for each of the ordinal values, a likelihood of receiving a user response having that ordinal value.

19. The computer system of claim 18, wherein the instructions further cause the computer processor to perform steps comprising:

for each of the plurality of video frames, the video frame displaying a traffic entity:
determining a cumulative histogram for the video frame, wherein the cumulative histogram value corresponding to an ordinal value represents an aggregate of histogram values corresponding to each of the plurality of ordinal values that are less than or equal to the ordinal value.

20. The computer system of claim 17, wherein the instructions for navigating the autonomous vehicle cause the computer processor to perform steps comprising:

capturing a video frame;

providing the video frame as input to the neural network; and determining signals sent to controls of the autonomous vehicle based on the output of the neural network.

\* \* \* \* \*

UNITED STATES PATENT AND TRADEMARK OFFICE
CERTIFICATE OF CORRECTION

PATENT NO.        : 11,572,083 B2
APPLICATION NO.   : 16/932680
DATED             : February 7, 2023
INVENTOR(S)       : Jacob Reinier Maat It is certified that error appears in the above-identified patent and that said Letters Patent is hereby corrected as shown below:

In the Claims

In Column 28, in Claim 16, Line 20, delete "claim 10," and insert -- claim 9, --, therefor.

Signed and Sealed this
Second Day of April, 2024

Katherine Kelly Vidal
*Director of the United States Patent and Trademark Office*